US008965958B2

United States Patent
Myerscough et al.

(10) Patent No.: US 8,965,958 B2
(45) Date of Patent: Feb. 24, 2015

(54) FILE FETCH FROM A REMOTE CLIENT DEVICE

(75) Inventors: Micah Myerscough, Redmond, WA (US); Chenguang Yang, Redmond, WA (US); Kyle Von Haden, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 401 days.

(21) Appl. No.: 13/282,616

(22) Filed: Oct. 27, 2011

(65) Prior Publication Data

US 2013/0110903 A1    May 2, 2013

(51) Int. Cl.
G06F 15/16 (2006.01)
G06F 17/30 (2006.01)
H04L 29/08 (2006.01)

(52) U.S. Cl.
CPC .......... *G06F 17/30106* (2013.01); *H04L 67/06* (2013.01); *H04L 67/02* (2013.01); *H04L 67/28* (2013.01)
USPC ............................ 709/203; 709/217; 709/223

(58) Field of Classification Search
CPC .... H04L 67/02; H04L 67/06; G06F 17/30106
USPC ................... 709/203, 217–219, 223
See application file for complete search history.

(56) References Cited

U.S. PATENT DOCUMENTS

| | | | |
|---|---|---|---|
| 5,239,648 A | 8/1993 | Nukui | |
| 6,618,752 B1 * | 9/2003 | Moore et al. | 709/217 |
| 7,496,611 B2 * | 2/2009 | Rasmussen et al. | 707/999.201 |
| 2004/0145605 A1 | 7/2004 | Basu et al. | |
| 2005/0021669 A1 * | 1/2005 | Cohen et al. | 709/217 |
| 2005/0027673 A1 | 2/2005 | Moritani et al. | |
| 2006/0075144 A1 | 4/2006 | Challener et al. | |
| 2006/0123062 A1 * | 6/2006 | Bobbitt et al. | 707/200 |
| 2006/0242259 A1 | 10/2006 | Vallabh et al. | |
| 2008/0301246 A1 | 12/2008 | Gkantsidis et al. | |
| 2009/0070427 A1 | 3/2009 | Gava et al. | |
| 2009/0089298 A1 * | 4/2009 | Enko et al. | 707/10 |
| 2009/0150486 A1 * | 6/2009 | Franco et al. | 709/203 |
| 2009/0305778 A1 | 12/2009 | Yu et al. | |

OTHER PUBLICATIONS

Myers, Adam., "Having Word automatically save local copies of documents", Retrieved at <<http://www.howinthetech.com/having-word-automatically-save-local-copies-of-documents/>>, Feb. 22, 2011, pp. 3.

(Continued)

*Primary Examiner* — Philip B Tran
(74) *Attorney, Agent, or Firm* — Steve Crocker; David Andrews; Micky Minhas

(57) ABSTRACT

Techniques for an electronic file fetch system are described. A method may comprise sending a request for a roaming file list to a file fetch server from a first client device and receiving the roaming file list from the file fetch server by the first client device. The roaming file list includes a unique identifier associated with an application file stored on a second client device. The unique identifier includes a machine identifier identifying the second client device and a local file path portion identifying the file path of the application file stored on the second client device. Based on the machine state of the second client device as indicated in the roaming file list, the application file stored on the second client device may be downloaded to the first client device. Other embodiments are described and claimed.

20 Claims, 19 Drawing Sheets

(56) References Cited

OTHER PUBLICATIONS

"Using Local Drives in Remote Desktop Connections", Retrieved at <<http://www.howtogeek.com/wiki/Using_Local_Drives_In_Remote_Desktop_Connections>>, Retrieved Date: Jul. 7, 2011, pp. 5.

"How to gain access to local files in a remote desktop session to a Windows XP-based or to a Windows Server 2003-based host computer", Retrieved at <<http://support.microsoft.com/kb/313292>>, Retrieved Date: Jul. 7, 2011, pp. 2.

"International Search Report", Mail Date: Apr. 1, 2013, Application No. PCT/US2012/062008, Filed date: Oct. 25, 2012, pp. 9.

* cited by examiner

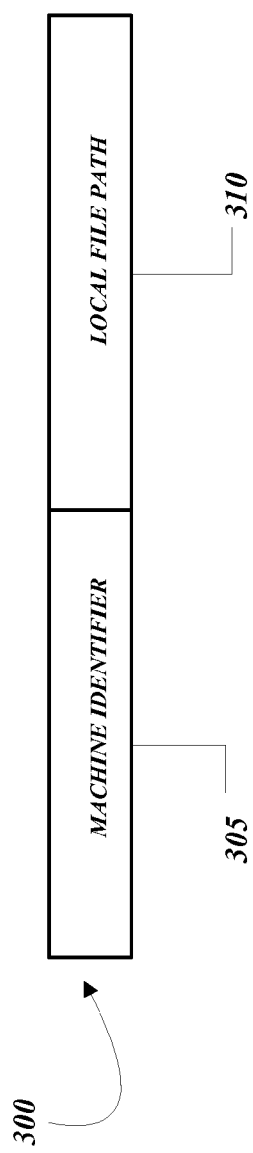
FIG. 3
FIG. 7

FILE FETCH FROM A REMOTE CLIENT DEVICE

BACKGROUND

Application files saved locally to a hard drive or other memory component of a first machine are not easily accessible via a second machine that is remote from the first machine. This is due to the distinction in local memory between the machines. One way for a user to access an application file stored on the first machine is to first transfer the application file from the first machine to a server hosted location accessible by the user via the second machine that is remote from the first machine. However, this requires forethought by the user to recognize that the application file will be needed in the future and to save the file to a server hosted location where the user may access it using the second machine which is remote from the first machine. This also requires that the user have access to a server hosted location and sufficient space on the server hosted location to save the application file.

Alternatively, an application file may be synched between the first and second machines so that a user may access this application file from either machine. However, this necessitates synchronizing the application file peer-to-peer which requires additional resources from the first machine regardless of whether or not the application file is ever accessed via the second machine. This results in a waste of device resources. In addition, synching the application file peer-to-peer may also require the application file to be saved in a specific location on the hard drive of the first machine and that in turn requires forethought by the user that the application file will be needed at a later time. It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to electronic file fetch systems. Some embodiments are particularly directed to an electronic file fetch system arranged to retrieve an application file from a remote client device. The electronic file fetch system may allow a user to save an application on a first client device and retrieve that same application file from a second client device which is remote from the first client device. In one embodiment, a user registers the first and second client devices with a web service to allow communication therebetween. The file fetch system utilizes a roaming file list sent from the first client device to the web service on a file fetch server. The roaming file list includes a list of application files saved locally on the first client device. The roaming file list is retrieved from the file fetch server by the second client device. In one embodiment, if the machine state of the first client device is "ON", a user may select an application file listed on the roaming file list for download from the first client device. The machine state of the first client device determines whether or not the application file saved locally on that device is available for download to the second client device. A communication connection is established between the first client device, and the second client device to allow the application file to be downloaded to the second client device.

In one embodiment, for example, an apparatus may comprise a logic device and a file manager component operative on the logic device. The logic device may comprise, for example, a processor that accesses memory. The file manager component is operative to receive a roaming file list from a file fetch server via a communication connection established therebetween. The roaming file list includes an application file identifier corresponding to an application file stored on a remote client device. The file manager component is operative to receive the application file identifier in the roaming file list from the file fetch server with a status indicator representing a machine state of the remote client device on which the application file is stored. A communication connection is established between the file fetch server and the remote client device to allow the application file to be retrieved from the remote client device. The file manager component is operative to receive the application file stored on the remote client device. The apparatus may further comprise an application program operative to open the application file received from the remote client device. The file manager component establishes a communication connection with a server hosted location and is operative to send a control directive to the server hosted location to save the application file received from the remote client device to the server hosted location for future retrieval by a user. Other embodiments are described and claimed.

BRIEF DESCRIPTION OF THE DRAWINGS

FIG. 3 illustrates a block diagram of an exemplary globally unique identifier.

FIG. 7 illustrates a functional block diagram of a roaming file list.

DETAILED DESCRIPTIONS

Figure 1:
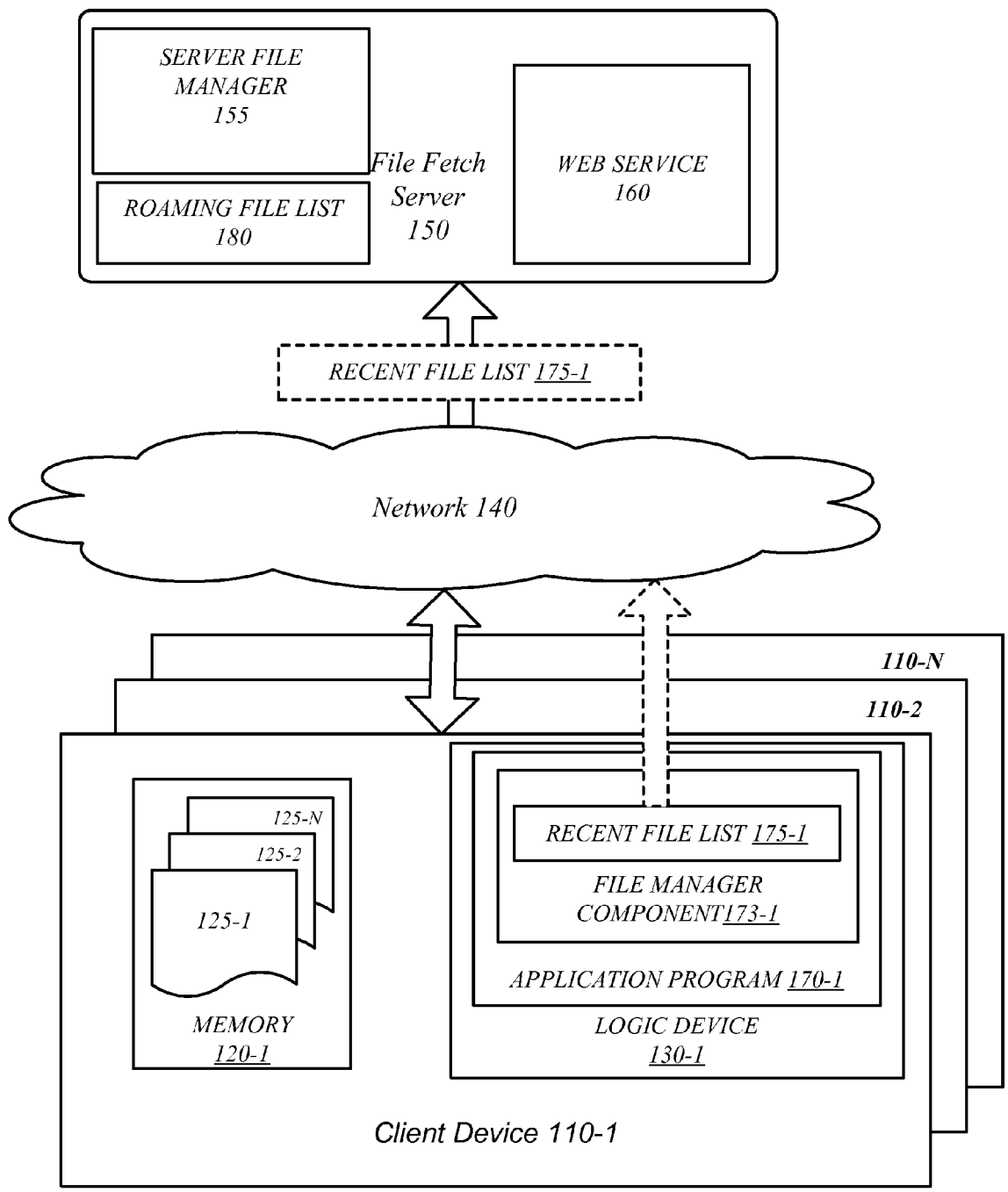
FIG. 1 illustrates an embodiment of a file fetch system.

Various embodiments are generally directed to a file fetch system used to provide access to a file saved on a local memory of a first client device by a second remote client device. The file fetch system generates a roaming file list comprising application file identifiers of application files associated with an application program saved on the first client device. The roaming file list is generated by a file fetch server based on, for example, a recent file list of application files sent from the first client device to a web service implemented by the file fetch server.

In many cases, a user such as a knowledge worker may use multiple heterogeneous computing devices suitable for a given work environment. For instance, the user may have a desktop computer at a home or office for core work, a laptop computer for mobile work, and a smart phone for instant connectivity. While the use of multiple heterogeneous devices adds convenience in the form of computing platforms, it comes at the cost of increased complexity in file management across these numerous devices. The file fetch system solves these and other problems by allowing a user to easily access an application file from multiple heterogeneous devices regardless of which device is currently storing the application file. As a result, the file fetch system reduces costs associated with managing application files across multiple devices, while enhancing user convenience, flexibility, and experience.

The file fetch system may allow a user to access an application file locally saved on a first client device from a second client device remote from the first client device without having to anticipate needing to first save that application file to a server hosted location or removable memory device. Instead, a roaming file list may be maintained by a web service and accessed by authorized client devices registered with the web service to select a particular application file identified in the roaming file list for download from the first client device to the second client device.

Each time a user saves an application file to local memory on a first client device, a unique identifier is assigned as a roaming setting for the particular application file. The unique identifier includes a machine identifier unique to the first client device and a local file path portion representing where on the first client device the application file is stored. The roaming file list is provided to a web service from the first client device via any one of various communications networks. A user may register particular client devices with the web service so that the client devices have access to the roaming file list as well as application files identified on the roaming file list regardless of which client device the application file is stored on. When the registered user accesses the application program from the second client device, the application program requests the roaming file list from the web service. The web service checks the machine state of the first client device. The web service may update the availability of the application files identified in the roaming file list based on the machine state of the first client device before sending the roaming file list to the second client device. Alternatively, the web service may send the roaming file list to the second client device and subsequently send one or more updates to indicate the availability of each of the application files identified on the roaming file list before the roaming file list is displayed to a user of the second client device. As a further alternative, the web service may send the roaming file list to the second client device and may send a subsequent update to the second client device after the roaming file list is displayed to a user of the second client device, but as the machine state of the first client device is updated by the web service. For example, if the machine state of the first client device is "ON" then the application files stored on the first client device are available to the second client device via the file fetch server. If the machine state of the first client device is "OFF" then the application files stored on the first client device are unavailable to the second client device via the file fetch server. Alternatively, the machine state of the first client device may be in a "standby" mode. In this case, if the client device can be accessed by the web service, then the machine state of the device will be treated as ON and if the client device cannot be accessed by the web service, then the machine state of the device will be treated as OFF. In this manner, the roaming file list is received by the second client device and indicates the availability of each of the application files included in the list. If a user selects an available application file identified on the roaming file list for download, the web service automatically establishes a communication connection with the first client device over a network and retrieves the selected application file for download to the second client device. In this manner, a user who saves a file to local memory on a first machine can seamlessly access that same file from a second machine through the use of a roaming list of recently edited files.

FIG. 1 illustrates a block diagram of a file fetch system 100 including any number of client devices 110-1 . . . 110-N where "N" is a positive integer. It is worthy to note that the use of "N" for different devices or components of the file fetch system 100 does not necessarily imply a same number of different devices or components. The file fetch system 100 may further include a file fetch server 150 communicating with one or more of the client devices via network 140. Each of the client devices 110-1 . . . 110-N generally includes a logic device (e.g. logic device 130-1) and some form of memory 120-1. Each of client devices 110-1 . . . 110-N as illustrated includes a limited number of elements in a certain topology for the purpose of ease of explanation. However, it should be appreciated that each of the client devices 110-1 . . . 110-N may include the elements as described with reference to FIG. 16 as well as more or less elements in alternate topologies depending on the type of client device employed. Examples of such client devices 110-1 . . . 110-N may include without limitation a personal computer (PC), mobile device, a personal digital assistant, a mobile computing device, a smart phone, a computer, a desktop computer, a laptop computer, a notebook computer, a handheld computer, a tablet computer, a server, a work station, a mini-computer, a distributed computing system, a multiprocessor system, a processor-based system, a gaming device, consumer electronics, a television, a digital television, combinations thereof, and/or web renderings of the foregoing.

For purposes of this disclosure, client devices 110-1 and 110-2 will be used as an example of the client device 110-1 . . . 110-N, however the description herein is equally applicable to any of the client devices 110-1 . . . 110-N. In particular, client device 110-1 includes logic device 130-1 arranged to execute an application program 170-1 having a file manager component 173-1. Memory 120-1 may be used to store application files 125-1 . . . 125-N and file manager component 173-1 is used to provide a user with one or more of the application files 125-1 . . . 125-N. In one embodiment, for example, the logic device 130-1 may comprise a processing system having a processor and memory. A user may, for example, use the file manager component 173-1 and application program 170-1 to create, open, edit, print, copy, or otherwise manage one or more application files 125-1 . . . 125-N. Alternatively, the application program 170-1 may be stored on a remote server application accessible via network 140 which accesses an application file 125-1 . . . 125-N stored in memory 120-1 of client device 110-1. Examples of application program 170-1 may include client-based application programs (or "client applications") such as, without limitation, MICROSOFT® WORD, MICROSOFT EXCEL®, MICROSOFT POWERPOINT®, MICROSOFT OUTLOOK®, MICROSOFT ACCESS®, MICROSOFT INFOPATH®, MICROSOFT ONENOTE®, MICROSOFT PROJECT, MICROSOFT PUBLISHER, MICROSOFT SHAREPOINT® WORKSPACE, MICROSOFT VISIO®, MICROSOFT OFFICE INTERCONNECT, MICROSOFT OFFICE PICTURE MANAGER, MICROSOFT SHAREPOINT DESIGNER, MICROSOFT LYNC. Examples of application program 170-1 may further include server-based application programs (or "cloud applications") such as, without limitation, MICROSOFT WINDOWS LIVE®, MICROSOFT OFFICE WEB APPLICATIONS, MICROSOFT OFFICE LIVE, MICROSOFT LIVE MEETING, MICROSOFT OFFICE PRODUCT WEB SITE, MICROSOFT UPDATE SERVER, and MICROSOFT OFFICE 365.

It is worthy to note that although the file manager component 173-1 is shown in FIG. 1 as an integrated part of the application program 170-1, it may be appreciated that the file manager component 173-1 may be implemented as part of another software program separate from the application program 170-1. For instance, the file manager component 173-1 may be implemented as part of a system program, such as an operating system (OS) for the client device 110-1 which is made accessible to the application program 170-1. Alternatively, the file manager component 173-1 may be implemented as a stand-alone software program separate from the application program 170-1. This implementation may allow the file manager component 173-1 to be used as a shared resource among different application programs 170-1. In addition, although the file fetch server 150 is shown and described as a single server environment this has been done for ease of explanation. It should be understood that the file fetch server 150 may be implemented as one or more servers, server farm and/or distributed server architecture. For instance, file fetch server 150 may represent a first server that manages the generation and transmission of a roaming file list (e.g. 180) and a separate server that communicates with the first server and manages the fetching/transmission of an application file (e.g. 125-1) retrieved from one client device (e.g. 110-1) and sent to another client device (e.g. 110-2).

The following describes the generation of a roaming file list (e.g. 180) by file fetch server 150 based on a recent file list (e.g. 175-1) received from a particular client device (e.g. client device 110-1) in accordance with an exemplary embodiment. The roaming file list 180 is generated by extracting all or a portion of the information contained in the recent file list 175-1. In particular, the recent file list 175-1 is generated by file manager component 173-1 which assigns a unique identifier for each application file saved on client device 110-1. Alternatively, the recent file list may be generated by a program separate from the file manager component 173-2, but within the application program 170-2 in which case the steps described herein as being performed by the file manager component 173-2 would likewise be performed by such separate program. When an application file 125-1 . . . 125-N is stored in memory 120-1, the file manager component 173-1 assigns a globally unique identifier (GUID) to the particular application file. Briefly (and as described in more detail with reference to FIG. 3), the GUID includes a machine identifier 305 and a local file path portion 310. The GUID may be locally unique to a particular user of a client device 110-1 . . . 110-N and the user is globally unique to all other users. The machine identifier 305 is a unique identifier for a particular one of the client devices 110-1 . . . 110-N (e.g. client device 110-1) and the local file path portion 310 is the path within the particular one of the client devices 110-1 where the particular application file (e.g. application file 125-1) is stored. Each application file 125-1 . . . 125-N is assigned a unique GUID by the file manager component (e.g. file manager component 173-1) associated with each application program (e.g. application program 170-1) when the application file is saved.

The recent file list 175-1 includes certain of the application files 125-1 . . . 125-N accessed by a user of client device 110-1 associated with the particular application program 170-1. The recent file list 175-1 may be provided when a user opens the particular application program 170-1. For example, a recent file list 175-1 for MICROSOFT WORD may provide a listing of document files recently stored in memory 120-1 of client device 110-1. The recent file list 175-1 may be a subset of all the application files for a particular application program, may be limited by a predetermined number of application files, and/or may be limited by a date range. This provides one convenient way for the application program 170-1 to identify a set of application files from application files 125-1 . . . 125-N that may be most relevant to a user. Again, each application file 125-1 . . . 125-N stored in memory 120-1 includes a GUID. The recent file list 175-1 may provide the user with the GUID or may only provide a user readable file path derived from all or a portion of the GUID when the application files listed in recent file list 175-1 are saved locally on client device 110-1.

Although the recent file list 175-1 may include a subset of application files 125-1 . . . 125-N using a temporal limitation for application files 125-1 . . . 125-N recently stored in memory 120-1 for client device 110-1, it may be appreciated that the recent file list 175-1 may alternatively remove the temporal limitation and include an entire set of application files 125-1 . . . 125-N stored in memory 120-1 for client device 110-1. In this arrangement, a user may retrieve any of the application files 125-1 . . . 125-N stored by the client device 110-1 from another client device (e.g. 110-2).

The recent file list 175-1 is sent to the file fetch server 150 where roaming file list 180 is generated. This may occur, for example, at various predetermined time intervals by file manager component 173-1, during use of the application program 170-1, sent upon the occurrence of a particular instruction from application program 170-1, or pushed from the file fetch server 150 based on an update to the roaming file list 180 from a client device (e.g. 110-2) different from client device 110-1. When the recent file list 175-1 is received by file fetch server 150, the server file manager 155 may process the recent file list 175-1 to generate the roaming file list 180. This processing may include extraction of all or part of the data contained in the recent file list 175-1 received from file manager component 173-1 and includes the GUID associated with each application file identified in the recent file list 175-1. The processing may optionally include data format conversion between data schemas as needed for particular application programs (e.g. 170-1). The application files 125-1 . . . 125-N identified in the roaming file list 180 are not necessarily saved on the file fetch server 150, but rather the roaming file list 180 is a list of the application files 125-1 . . . 125-N identified on the recent file list 175-1 received from client device 110-1. In addition, each time the recent file list 175-1 is saved to file fetch server 150, server file manager 155 rewrites or reprocesses the information received in the recent file list to generate a current roaming file list 180. In particular, server file manager 155 may extract any portion of the information received in recent file list 175-1 as desired for a given implementation, but must include at least the GUID for each of the application files 125-1 . . . 125-N.

The roaming file list 180 may be generated based on a particular application program 170-1 that the application files 125-1 ... 125-N are associated with, and/or by a client device 110-1, 110-2. In particular, server file manager 155 may generate a roaming file list 180 for each different type of application program 170-1 on client device 110-1. For example, if client device 110-1 includes a word processing application program and a database application program, each file manager component 173-1 associated with the corresponding application program 170-1 on client device 110-1 may generate a separate recent file list 175-1 for each application program 170-1 and send each of these recent file lists 175-1 to file fetch server 150. In turn, server file manager 155 may generate separate corresponding roaming file lists 180 for each received recent file list 175-1 associated with each of the word processing and database application programs. Alternatively and as an additional example, server file manager 155 may receive each of the recent file lists 175-1 from client device 110-1 and generate one roaming file list 180 unique to the client device 110-1 or unique to a registered user and save this roaming file list 180 on file fetch server 150.

In order to send the recent file list 175-1 to file fetch server 150 to generate roaming file list 180, a communication session is established between client device 110-1 and file fetch server 150. In particular, web service 160 provides communications between file fetch server 150 and client device 110-1 by establishing a machine-to-machine connection therebetween over network 140. Web service 160 is also used to provide communication and interaction between client device 110-1 and client device 110-2 via network 140 as well as to manage the transmission of one or more of the application files 125-1 ... 125-N to the remote client device 110-2 and the transmission of roaming file lists 180, 181 and 182 as described in more detail below. Although network 140 is illustrated as a single network, it should be understood that network 140 may comprise any number of separate and/or interconnected networks as described in more detail with reference to FIG. 19.

The various devices of the file fetch system 100 may communicate with each other over the network 140 utilizing web service 160. Web service 160 is a software architecture designed to support interoperable machine-to-machine interaction over network 140. In various embodiments, web service 160 may implement various web technologies, including remote procedure call (RPC) based technologies, simple object access protocol (SOAP) based technologies, service-oriented architecture (SOA) based technologies, or representational state transfer (REST) based technologies, among others.

In one embodiment, for example, web service 160 may utilize an interface described in a machine-processable format such as web services description language (WSDL) format. Other systems interact with the web service 160 in a manner prescribed by its description using SOAP messages. SOAP is a protocol specification for exchanging structured information to implement web services over a computer network. SOAP relies on extensible markup language (XML) as a message format. SOAP also relies on other application layer protocols, such as RPC and hypertext transfer protocol (HTTP), for message negotiation and transmission. SOAP can form a foundation layer of a web services protocol stack providing a basic messaging framework upon which web services 160 can be built. HTTL is an application layer request-response protocol specification for client-server computing.

A user must register with the web service 160 in order to utilize the file fetch system 100. In addition, a user must also register, with the web service, the particular devices (e.g. 110-1 ... 110-N) such as, for example, a desktop computer, a laptop computer and a smart phone in order for these devices to be recognized by web service 160 to send/receive roaming file lists as well as download particular application files between the devices. User registration with file fetch system 100 as well as the registration of particular client devices (e.g. 110-1 ... 110-N) with web service 160 may be performed automatically by application program 170-1 or may be initiated by a user. In addition, a user may arbitrarily assign different permission levels between and among the different client devices as part of the registration process. For example, a user may register a desktop computer with web service 160 and assign permissions to this device such that application files may be retrieved from and downloaded to the device. Alternatively, a user may register a laptop computer with web service 160 and assign permissions to this device such that application files may only be downloaded to the device from a remote client device. Web service 160 stores the permission profile associated with each of the registered client devices. By registering particular client devices, the web service authenticates the client device when, for example, an application program on that client device attempts to retrieve the roaming file list from the web service, thereby preventing unauthorized access to roaming file lists as well as application files stored locally on client devices.

Client device 110-1 is registered with web service 160 in order to allow the sending of recent file list 175-1 to file fetch server 150 as well as to later provide controlled access to application files 125-1 ... 125-N saved on client device 110-1 from another client device, for example client device 110-2 shown in FIG. 4 which is also registered with web service 160. For example, the client device 110-1 may register with the web service 160 using XML messaging that conforms to a particular data schema. Server file manager 155 receives the unique identifier for client device 110-1 and stores it in file fetch server 150 for access by web service 160. The unique identifier for a client device (e.g. client device 110-1) used to register the client device with web service 160 may correspond to the machine identifier of the GUID as described in more detail below. In this manner, a user registers particular client devices (e.g. 110-1, 110-2) with web service 160 to select those devices that can fetch or retrieve application files saved on other registered client devices.

Included herein are flow charts representative of exemplary methodologies for performing novel aspects of the disclosed architecture. While, for purposes of simplicity of explanation, the one or more methodologies shown herein, for example, in the form of a flow chart or logic flow are shown and described as a series of acts, it is to be understood and appreciated that the methodologies are not limited by the order of acts as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 2:
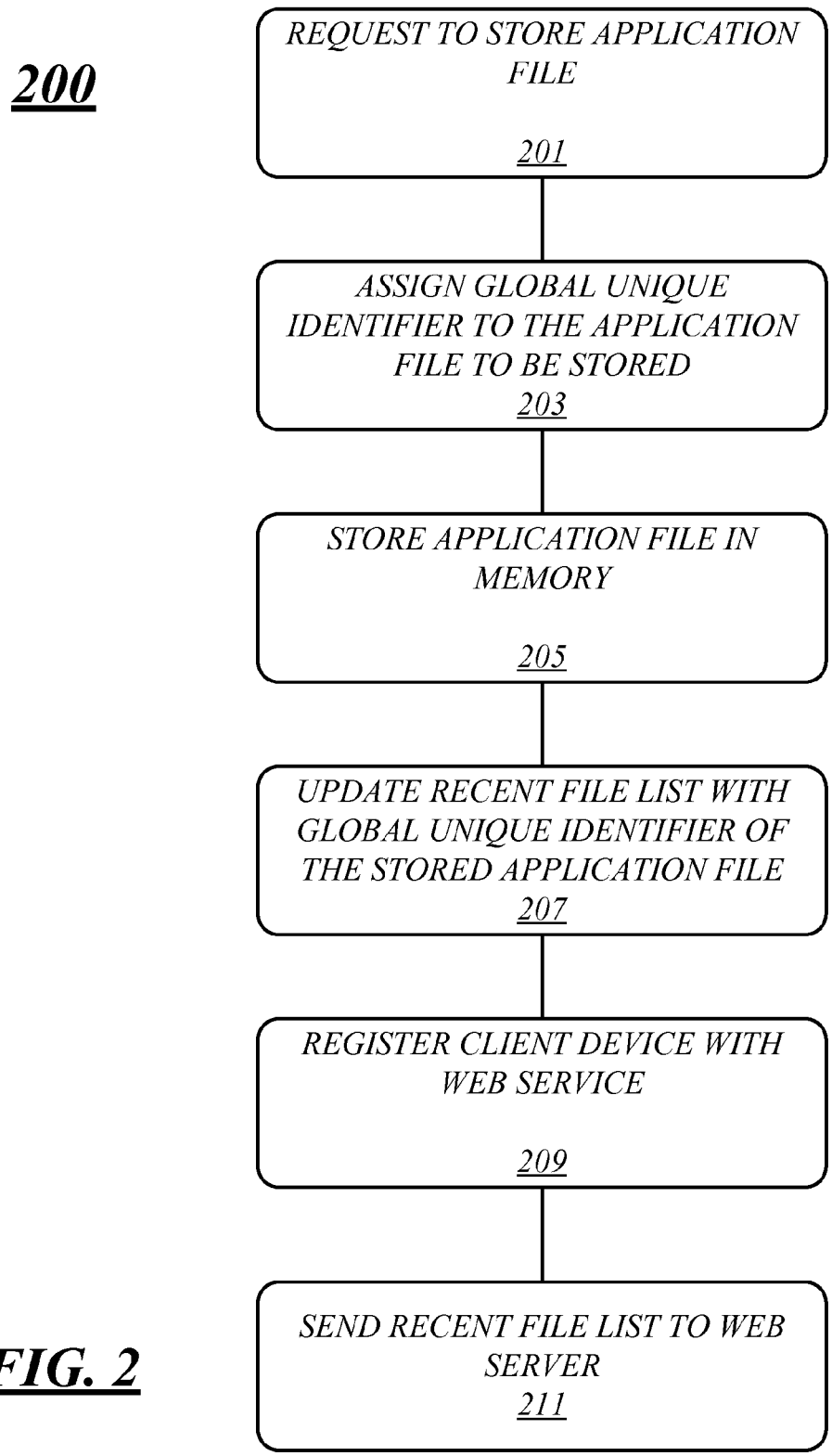
FIG. 2 illustrates an embodiment of a message flow for the system of FIG. 1.

FIG. 2 illustrates one embodiment of a logic flow 200 for the system of FIG. 1. The logic flow 200 may be representative of some or all of the operations executed by one or more embodiments described herein, such as the client device 110-1, for example.

In the illustrated embodiment shown in FIG. 2, an application program requests to store an application file at block 201. For example, the application program 170-1 and more particularly file manager 173-1, processes a request by a user to save an application file 125-1 to memory 120-1. The application file 125-1 is associated with a particular application program 170-1.

The logic flow 200 assigns a GUID to the application file to be stored at block 203. For example, the file manager component 173-1 of the application program 170-1 assigns a GUID to the particular application file 125-1 which includes a machine identifier 305 (FIG. 3) associated with the particular client device 110-1 and a local file path portion 310 (FIG. 3) associated with a particular application file 125-1 stored in a unique path within client device 110-1. The logic flow 200 stores the application file in memory at block 205. For example, the application file 125-1 associated with application program 170-1 may be stored in memory 120-1 of client device 110-1.

The logic flow 200 updates a recent file list with a GUID of the stored application file at block 207. For example, the file manager component 173-1 of the application program 170-1 updates the recent file list 175-1 with the GUID of the application file stored in memory 120-1.

The logic flow 200 sends the recent file list to a web server at block 211. For example, the recent file list 175-1 generated by application program 170-1 is sent to file fetch server 150 via network 140 for storage by server file manager 155. The recent file list 175-1 is uniquely identified for the particular client device 110-1 through the registration process described above. Each application file (e.g. 125-1) listed on the recent file list 175-1 includes a GUID which identifies the particular client device (e.g. 110-1) in which each application file (e.g. 125-1) is stored. In this manner, the web service 160 determines which application file (e.g. 125-1) is saved on which client device (e.g. 110-1) as described in more detail below.

FIG. 3 is a block diagram of an exemplary GUID 300. Again, when a user saves an application file (e.g. 125-1) associated with a particular application program (e.g. 170-1) locally to memory (e.g. 120-1) of a particular client device (e.g. 110-1), a GUID 300 is assigned to the locally saved application file. Each GUID 300 is used to identify an application file (e.g. 125-1) provided on the recent file list 175-1. Thus, there is a one-to-one correspondence between each GUID 300 and each application file (e.g. 125-1) identified on the recent file list 175-1. When the file fetch server 150 receives the recent file list 175-1 from file manager component 173-1 of client device 110-1 and saves it as roaming file list 180, each GUID 300 from the recent file list 175-1 is included in the roaming file list 180. Thus, the roaming file list 180 includes each GUID 300 representing a particular application file (e.g. 125-1) identified in the recent file list 175-1 received from client device 110-1.

As shown in FIG. 3, the GUID 300 may be comprised of a machine identifier 305 and a local file path portion 310. The machine identifier 305 of the GUID 300 identifies a particular machine or client device (e.g. 110-1) that an application file 125-1 is saved on. One example of a machine identifier 305 may comprise a device serial number or media access control (MAC) address which is globally unique. Alternatively, the machine identifier 305 may be randomly assigned by application program 170-1 and may be locally specific for a particular user (e.g. 110-1) rather than globally unique to all users (e.g. 110-1 . . . 110-N). For example, a user's desktop computer may be assigned the locally unique identifier "machine 1", the same user's laptop computer may be assigned the locally unique identifier "machine 2" and the user's mobile device may be assigned the locally unique identifier "machine 3". In this manner, the registered client devices are unique to a particular user which is globally unique to all users.

The local file path portion 310 of the GUID 300 identifies a location and a file name within the particular client device (e.g. 110-1) where the application file (e.g. 125-1) is stored and may be unique to a particular client device. One example of a local file path portion 310 may comprise a memory path in which the application file is stored including appropriate hard-drives, folder and file name. An application file (e.g. 125-1) saved on the same client device (e.g. 110-1) may have the same machine identifier 305 of GUID 300, but will have different local file path portions 310 comprising different local file paths with each local file path including a different file name usually indicated at the end of the local file path with a file extension associated with a particular application program (e.g. 170-1). Conversely, an application file saved on different client devices may have the same local file path portion 310, but would have a different machine identifier 305. For example, an application file 125-1 saved on a hard disk drive of client device 110-1 usually indicates the particular drive designation together with one or more folder and/or sub-folders, the name of the application file 125-1 and a file extension to indicate the particular application program 170-1 associated with the saved application file. For instance, a local file path portion 310 may comprise the following:

Computer→OS(C:)→Program Files→Microsoft Office→Office 15→test.docx

Thus, the GUID 300 provides an identifier associated with each saved application file 125-1 . . . 125-N such that one or more of the application files 125-1 . . . 125-N identified on the recent file list 175-1 associated with a particular application program 170-1 saved on a first client device 110-1 may be accessed by a remote client device (e.g. 110-2) if a machine state of the first client device 110-1 is in the ON state. As described in more detail below, if a client device is registered with web service 160 and the machine state is ON then the application files stored on that client device are available for download by other registered client devices via file fetch server 150. If a client device is registered with web service 160, but the machine state is OFF then the application files stored on that client device are unavailable for download by other registered client devices.

Figure 4:
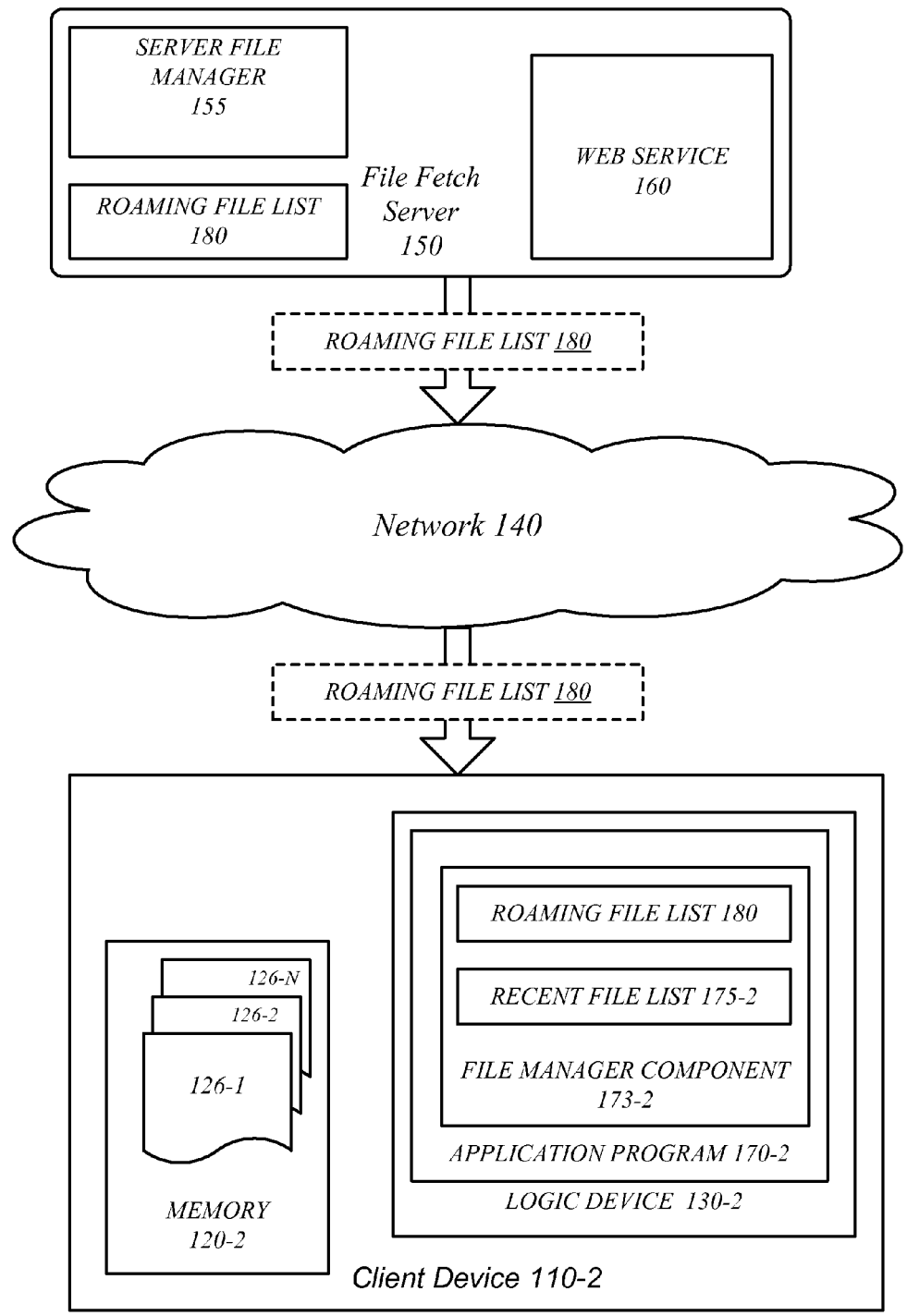
FIG. 4 illustrates a block diagram of a file fetch system.

FIG. 4 illustrates a block diagram of the file fetch system 100 in combination with a second client device, for example, client device 110-2 which is a separate device from client device 110-1. In particular, client device 110-2 may be of the same type as client device 110-1 described above, but is physically and logically separate from client device 110-1. Client device 110-2 may be in the same or different location than client device 110-1 and may include corresponding logic device 130-2 and memory 120-2 storing any number of application files 126-1 . . . 126-N. For example, client device 110-1 may be a desktop computer located at a user's office and client device 110-2 may be a portable computer; or client device 110-1 may be a laptop computer at a user's home, and client device 110-2 may be a desktop computer located at a user's office.

The use of the terms "available" or "unavailable" herein is intended to denote whether or not an application file may be downloaded from a remote client device using file fetch system 100. When a user opens the application program 170-2 on client device 110-2 remote from client device 110-1, application program 170-2 sends a control directive to web service 160 to retrieve the roaming file list 180 saved on file fetch server 150. The web service 160 establishes a secure communication session with client device 110-1 identified in the roaming file list 180 saved on file fetch server 150 to determine the state (e.g. the "ON state" or "OFF state") of the respective machine. If the client device 110-1 identified on the recent file list 175-1 is in the ON state and accessible by the file fetch server 150, the web service 160 updates the roaming file list 180 stored on file fetch server 150 to indicate that the one or more application files 125-1 . . . 125-N identified on the roaming file list 180 saved on client device 110-1 are available. If the client device 110-1 identified on the recent file list 175-1 is in the OFF state and not accessible by the file fetch server 150, the web service 160 updates the roaming file list 180 stored on file fetch server 150 to indicate that the one or more application files 125-1 . . . 125-N identified on the roaming file list 180 saved on client device 110-1 are unavailable.

Alternatively, web service 160 may send roaming file list 180 to client device 110-2 and subsequently send one or more updates to indicate the availability of each of the application files (e.g. 125-1 . . . 125-N) based on the machine state of client device 110-1 before the roaming file list 180 is displayed to a user of client device 110-2. As another alternative, web service 160 may send the roaming file list 180 to client device 110-2 and may also send subsequent updates to the client device 110-2 after the roaming file list 180 is displayed to a user of the client device 110-2, but as the machine state of client device 110-1 is updated by web service 160. In this manner, if the machine state of client device 110-1 is OFF when web service sends the roaming file list 180 to client device 110-2, but the machine state of client device 110-1 changes to the ON state, web service 160 provides this update to the roaming file list 180 already displayed to a user of client device 110-2. For ease of explanation it will be understood that an application file 125-1 will be representative of one or more of the application files 125-1 . . . 125-N that may be identified on roaming file list 180 associated with client device 110-1. If the client device 110-1 identified in the roaming file list 180 saved on file fetch server 150 is not in the ON state, or otherwise not accessible by the file fetch server 150, the web service 160 updates the recent file list 175-1 to indicate that the application file 125-1 identified on the roaming file list 180 saved on client device 110-1 is unavailable. Once the machine state of client device 110-1 identified on the recent file list 175-1 is updated as being ON or OFF, the web service 160 sends the updated roaming file list 180 to application program 170-2 on remote client device 110-2 via network 140 to indicate if an application file saved on that client device is available or unavailable. The application file 125-1 identified on the roaming file list 180 as unavailable based on the machine state of the corresponding client device 110-1 is still identified in the roaming file list 180 when supplied to file manger component 173-2 of application program 170-2, but is indicated as unavailable as described in more detail with reference to FIG. 8. Alternatively, web service 160 may remove the unavailable application files from roaming file list 180 and only provide a listing of the available application files (125-1 . . . 125-N) to client device 110-2. In this manner, the machine state of a client device (e.g. ON or OFF) dictates whether or not an application file stored on the client device is available or unavailable to other client devices.

Figure 5:
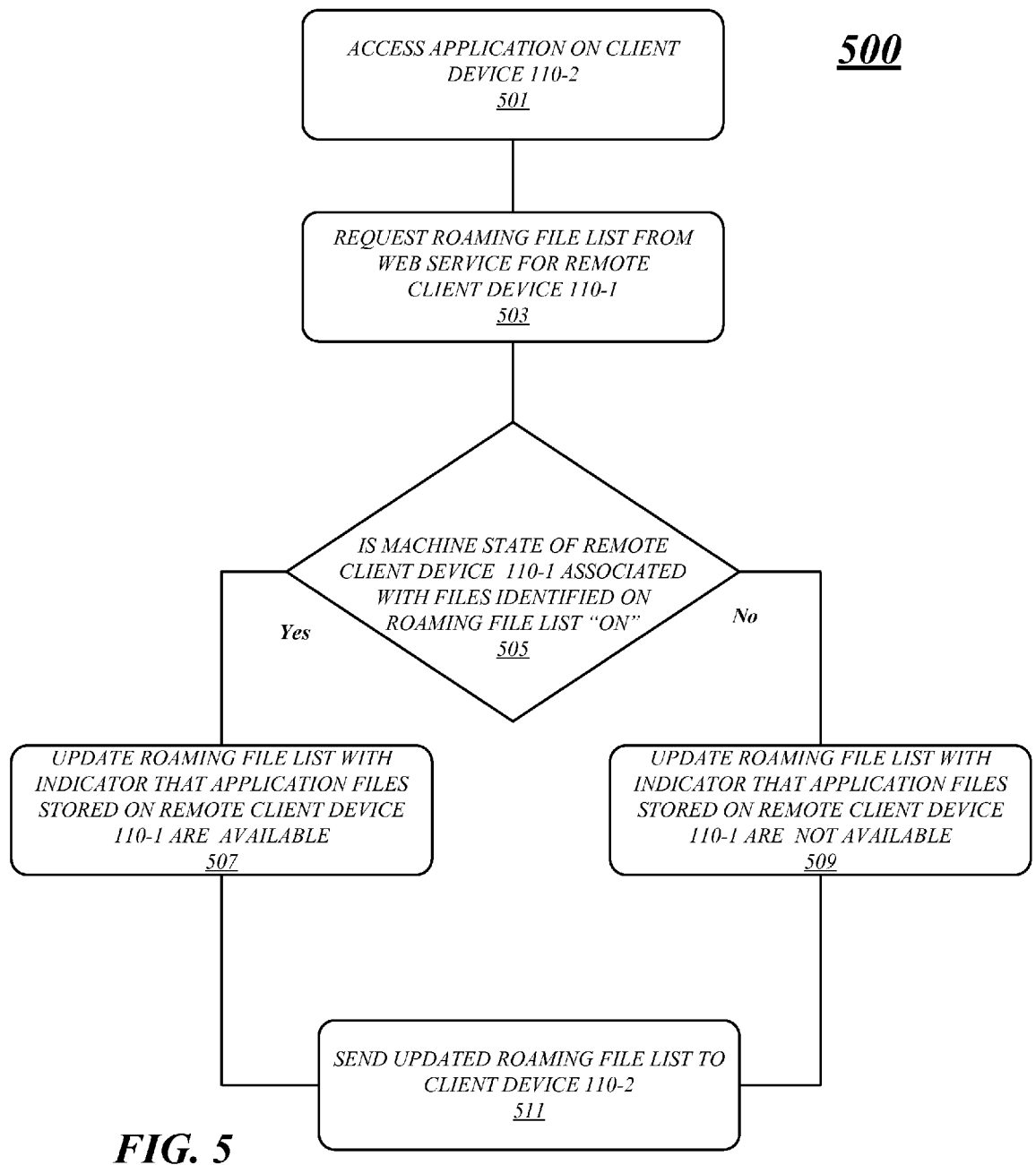
FIG. 5 illustrates an embodiment of a message flow for the system of FIG. 3

FIG. 5 illustrates an embodiment of a logic flow 500 for the file fetch system of FIG. 4. The logic flow 500 may be representative of some or all of the operations executed by one or more embodiments described herein such as the client device 110-2, for example.

In the illustrated embodiment shown in FIG. 5, the logic flow 500 monitors access of an application program on a client device at block 501. For example, when a user accesses an application program 170-2 on a client device 110-2, the application program 170-2 generates a recent file list 175-2, but waits to update the recent file list 175-2 with application file information from roaming file list 180 identifying certain application files 125-1 stored on registered client device 110-1.

The logic flow 500 requests the roaming file list from the web server for client device 110-1 at block 503. For example, the file manager component 173-2 of the application program 170-2 or the application program 170-2 establishes a secure communication session with file fetch server 150 to have the web service 160 send the roaming file list 180 to client device 110-2.

Before sending the roaming file list, the logic flow 500 determines the state of each client device identified in the roaming file list from the web service at block 505. For example, before sending the roaming file list 180 to client device 110-2, the server file manager 155 utilizes the web service 160 to determine the state (e.g. ON state or OFF state) of client device 110-1 corresponding to the machine identifier 305 of each GUID 300 identified in the recent file list 175-1 as being saved locally at client device 110-1. As another example, the roaming file list 180 may be sent to client device 110-2 and subsequently updated by web service 160 based on the machine state of client device 110-1. The logic flow 500 updates the roaming file list with an available indicator if an application file identified on the roaming file list 180 is available at block 507 and updates the roaming file list 180 with an unavailable indicator, different from the available indicator, if the application file identified on the roaming file list is unavailable at block 509. For example, if the roaming file list 180 includes an application file with a GUID 300 having a machine identifier 305 that corresponds to client device 110-1, the machine state of client device 110-1 is checked by web service 160. To determine the machine state of client device 110-1, web service 160 attempts to establish a communication connection via network 140 using, for example, SOAP messaging between file fetch server 150 and client device 110-1. If the machine state of client device 110-1 is ON, then the web service 160 updates the application files identified on roaming file list 180 having a machine identifier 305 of GUID 300 corresponding to client device 110-1 with an available indicator. If the machine state of client device 110-1 is OFF, then the web service 160 is unable to establish a secure communication session between the file fetch server 150 and client device 110-1. In this latter case, the application files 125-1 . . . 125-N identified on recent file list 175-1 having a machine identifier 305 of GUID 300 corresponding to client device 110-1 are updated with an unavailable indicator. Alternatively, the unavailable application files 125-1 . . . 125-N based on the OFF machine state of client device 110-1 may be removed from the roaming file list 180. The updated roaming file list 180 is saved on file fetch server 150. In this manner, the availability to download, open, or otherwise access the application files identified in the roaming file list 180 by client device 110-2 is updated based on the machine state of the client device 110-1.

The logic flow 500 sends the updated roaming file list to client device 110-2 at block 511. For example, once the server file manager 155 determines the machine state of client device 110-1 identified on the roaming file list 180 by the corresponding GUID 300 and has updated the recent file list 180 with a corresponding indicator to denote whether or not the application files stored on client device 110-1 corresponding to the machine identifier 305 of GUID 300 are available or unavailable, the server file manager 155 utilizes the web service 160 to send the updated roaming file list 180 to client device 110-2.

Figure 6:
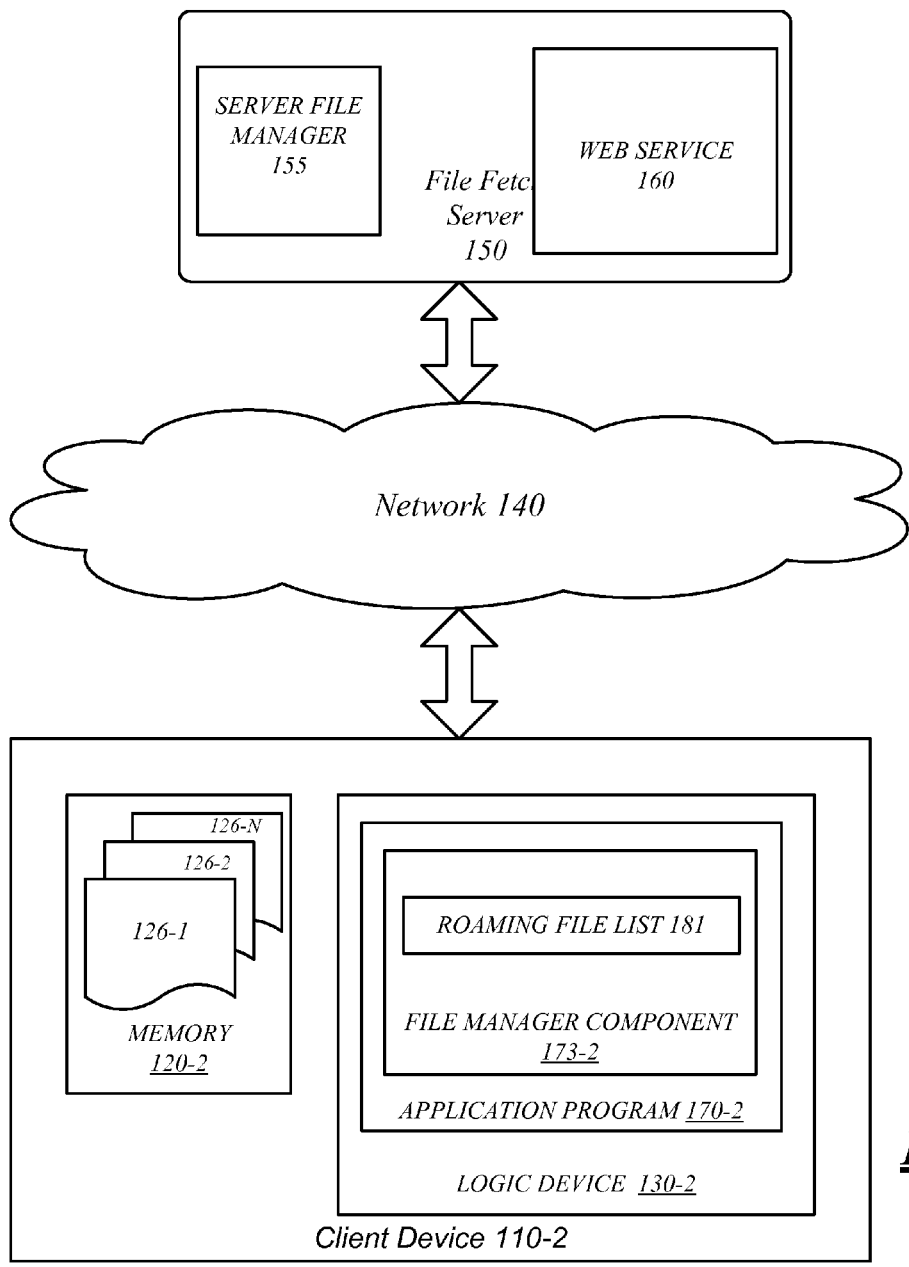
FIG. 6 illustrates a block diagram of a file fetch system.

FIG. 6 illustrates a block diagram of the file fetch system 100 in combination with client device 110-2 after receipt from file fetch server 150 of the roaming file list 180. In particular, the recent file list 175-2 is associated with the application files 126-1 . . . 126-N saved locally on client device 110-2 associated with application program 170-2. When client device 110-2 receives the roaming file list 180 from file fetch server 150 via the communication link established between the file fetch server 150 and client device 110-2, file manager component 173-2 combines the roaming file list 180 and the recent file list 175-2 to generate roaming file list 181. Again, the roaming file list 180 has been updated by web service 160 to indicate the application files stored on client device 110-1 that are available or unavailable to client device 110-2 based on the machine state of client device 110-1. Thus, roaming file list 181 is a combination of roaming file list 180 and recent file list 175-2 to indicate the application files available as well as those application files that are unavailable to a user of client device 110-2. Alternatively, the recent file list 175-2 may be added to the roaming file list 180 in those cases where a single roaming list is used for both of the client devices 110-1, 110-2.

FIG. 7 illustrates a functional block diagram of roaming file list 181. In particular, roaming file list 181 is a combination of roaming file list 180 received by client device 110-2 from file fetch server 150 via network 140 and recent file list 175-2 associated with the one or more locally saved application files 126-1 . . . 126-N on client device 110-2. The application file 125-1 identified on roaming file list 180 which is unavailable due to the machine state (e.g. OFF) of the corresponding client device 110-1 is still identified in the roaming file list 181, but is indicated as unavailable to the user of client device 110-2.

Figure 8A:
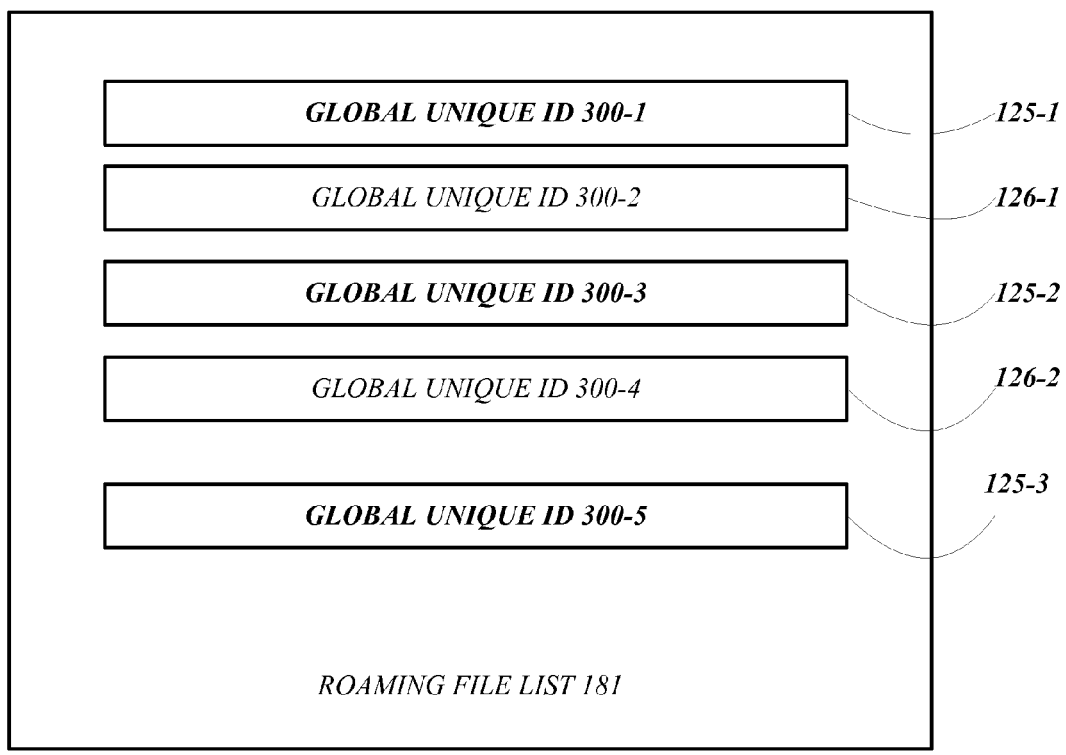
FIG. 8A illustrates an exemplary user interface view of a recent file list.

FIG. 8A illustrates an exemplary user interface view 800 of roaming file list 181 for visualization of available and unavailable application files associated with an exemplary client device 110-2. The exemplary user interface view 800 is produced by file manager component 173-2 and is initiated when application program 170-2 is opened and/or when a particular operation such as, for example, opening a saved file is requested by a user. The user interface view 800 may be displayed to a user via an output device (e.g. display) associated with client device 110-2.

Again, roaming file list 181 comprises application files 125, 126 from application file list 175-2 and roaming file list 180, respectively. By way of example and for purposes of explanation, application file list 175-2 may include application files 126-1 and 126-2 stored locally on client device 110-2 and roaming file list 180 may include application files 125-1, 125-2 and 125-3 stored on remote client device 110-1. In this particular example, the client device 110-1 may be referred to as a "remote client device" since it is physically remote from the client device 110-2 which includes roaming file list 181. Thus, user interface view 800 of roaming file list 181 lists application files 126-1 and 126-2 from recent file list 175-2 which are saved locally and available to client device 110-2, and application files 125-1, 125-2 and 125-3 from roaming file list 180 saved on client device 110-1. The application files 125-1, 125-2, 125-3, 126-1 and 126-2 each have a corresponding GUID 300-1 . . . 300-5, respectively. Each application file 125-1, 125-2, 125-3, 126-1 and 126-2 may have an associated status indicator to denote to the user whether or not a particular application file 125-1, 125-2, 125-3, 126-1 and 126-2 is available or unavailable to client device 110-2. For example, application files 125-1, 125-2 and 125-3 are illustrated as having a status indicator comprising bold text to indicate that these application files are not saved locally on user device 110-2. Application files 126-1 and 126-2 do not have such bold text since they are identified on recent file list 175-2, saved locally and available to client device 110-2.

The bold text is an example of visual indicia that denotes which of the application files 125-1, 125-2, 125-3, 126-1 and 126-2 on roaming file list 181 is not saved locally to client device 110-2. By way of example and not limitation, the bold text associated with application file names 125-1, 125-2 and 125-3 may be representative of the color green to indicate that these application files are not saved locally on client device 110-2, but that each is available to client device 110-2 from remote client device 110-1. Alternatively, the bold text associated with application files 125-1, 125-2 and 125-3 may be representative of the color red to indicate that these application files are not saved locally to client device 110-2 and are unavailable to a user of client device 110-2. The absence of color associated with application files 126-1 and 126-2 may indicate that these application files are saved locally on client device 110-2 and are available to a user. It may be appreciated that other visual indicators as well as combinations thereof may be used as well.

Figure 8B:
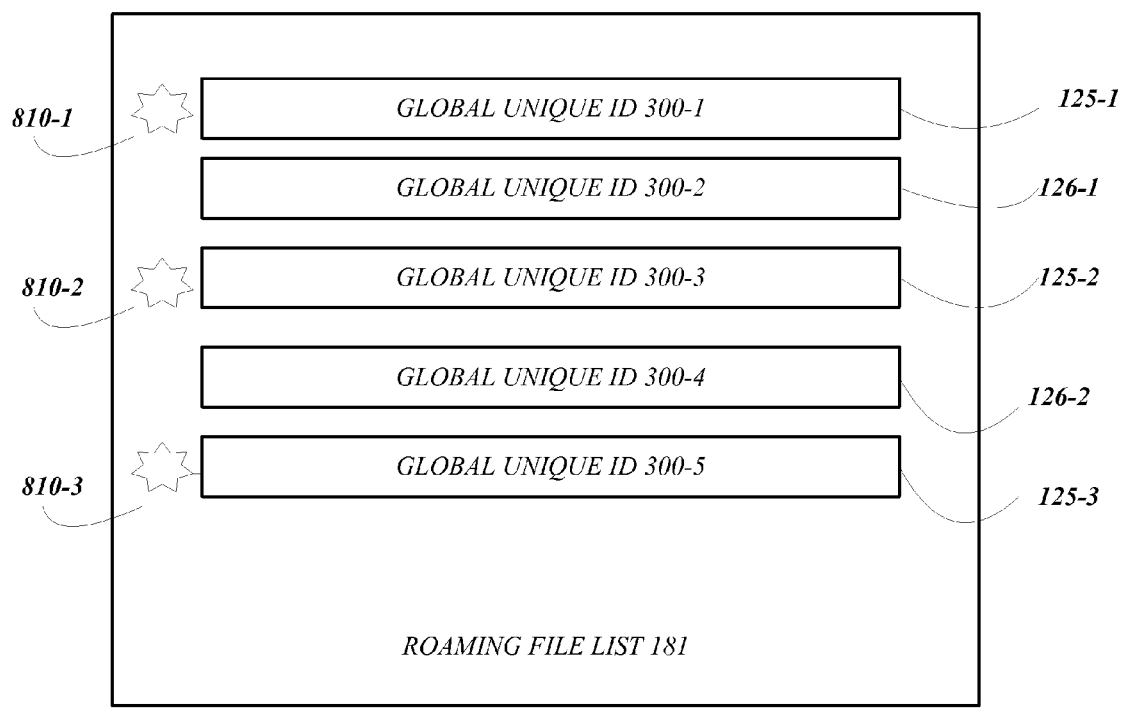
FIG. 8B illustrates an exemplary user interface view of a recent file list.

FIG. 8B illustrates another exemplary user interface view 840 of roaming file list 181 for visualization of available and unavailable application files associated with an exemplary client device 110-2. User interface view 840 of roaming file list 181 illustrates a list of application files 125-1, 125-2, 125-3, 126-1 and 126-2, each having a corresponding GUID 300-1 . . . 300-5, respectively. Particular ones of application files 125-1, 125-2, 125-3, 126-1 and 126-2 may have an associated indicator to denote to the user whether or not a particular application file 125-1, 125-2, 125-3, 126-1 and 126-2 is available or unavailable. For example, icons 810-1, 810-2 and 810-3 may be positioned next to the application files 125-1, 125-2, 125-3, respectively, to indicate that these application files 125-1, 125-2, 125-3 are not saved locally on client device 110-2 and also may be colored to indicate whether or not the application files are available to client device 110-2. Continuing with this example, icons 810-1, 810-2 and 810-3 may be positioned next to application files 125-1, 125-2, 125-3 to indicate that these application files are not saved locally on client device 110-2, but may also be colored red to indicate that these application files 125-1, 125-2, 125-3 are unavailable to client device 110-2. Alternatively, icons 810-1, 810-2 and 810-3 may be positioned next to application files 125-1, 125-2, and 125-3 to indicate that these application files are not saved locally on client device 110-2, but may also be colored green to indicate that these application files 125-1, 125-2, 125-3 are available to client device 110-2. Thus, icons 810-1, 810-2 and 810-3 may provide alternative visual indicia to indicate whether or not certain application files on roaming file list 181 are available to a user of client device 110-2.

Figure 8C:
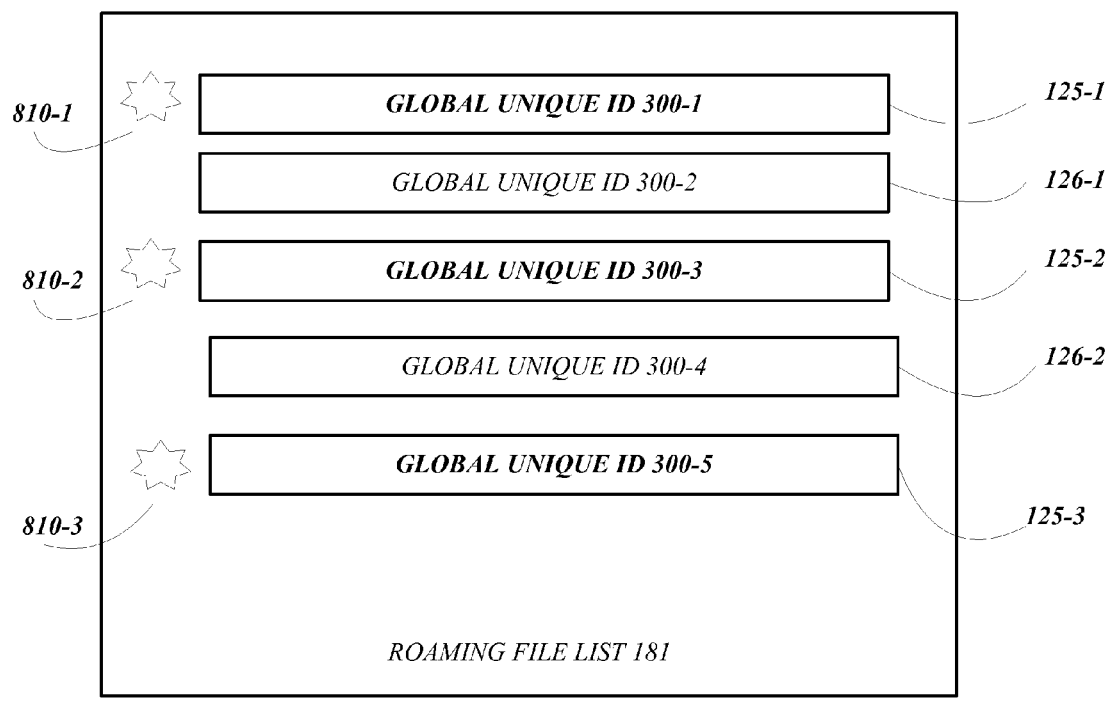
FIG. 8C illustrates an exemplary user interface view of a recent file list.

FIG. 8C illustrates another exemplary user interface view 850 of a roaming file list 181 for visualization of available and unavailable application files associated with an exemplary client device 110-2. User interface view 850 of roaming file list 181 illustrates a list of application files 125-1, 125-2, 125-3, 126-1 and 126-2, each having a corresponding GUID 300-1 . . . 300-5, respectively. Again the bold text associated with application files 125-1, 125-2, 125-3 may represent a color code for files that are not saved locally to client device 110-2 and the absence of such bold text for application files 126-1 and 126-2 indicates that these application files are stored locally and available to client device 110-2.

As another exemplary alternative, the application files 125-1, 125-2, 125-3 may also have an associated icon 810-1, 810-2 and 810-3 as further visual indicia to indicate whether or not the application file is available or unavailable. Thus, the bold text associated with application files 125-1, 125-2, 125-3 may represent the color green to indicate that these application files are not saved locally to client device 110-2 together with an associated icon 810-1, 810-2 and 810-3 also colored green to indicate that the machine state of the associated client device (client device 110-1) is in an ON state and application files 125-1, 125-2, 125-3 are available, but must be downloaded to the client device 110-2 before being accessible by the user. Alternatively, the bold text may represent the color red to indicate that the application files 125-1, 125-2, 125-3 are not stored locally on client device 110-2 and the associated icons 810-1, 810-2 and 810-3 are also colored red to indicate that the machine state of that client device where application files 125-1, 125-2, 125-3 are stored (e.g. client device 110-1) is in an OFF state and therefore the application files 125-1, 125-2, 125-3 are unavailable. In this manner, a user may easily visually identify those files that are saved locally and those that are available from a remote device and those that are stored on a remote client device, but are unavailable. Again, an application file is available to a user if the application file is stored locally on client device 110-2 or if it is stored on a remote client device (e.g. 110-1) and the machine state of the remote client device is in an ON state.

Figure 9:
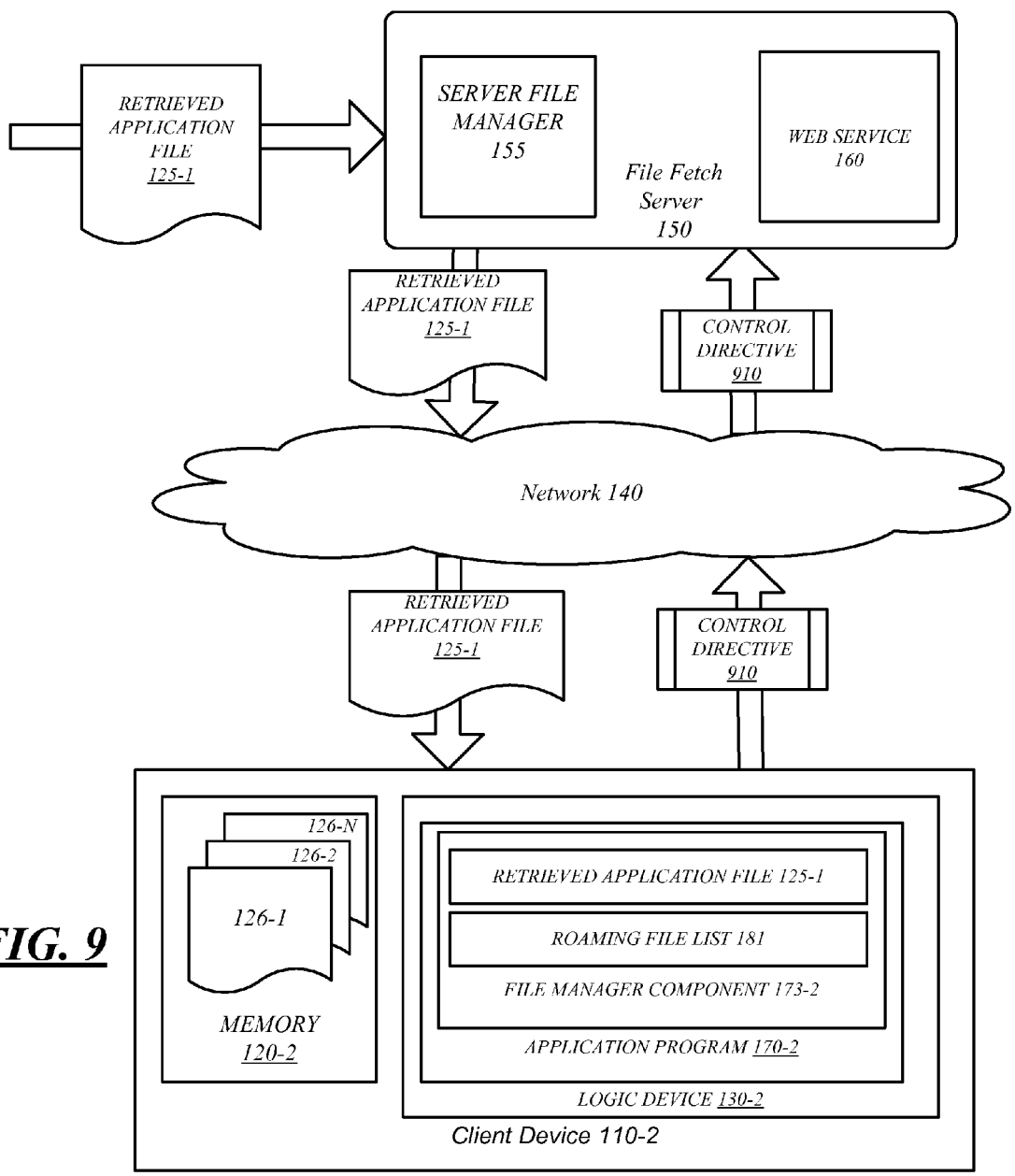
FIG. 9 illustrates an embodiment of a file fetch system.

FIG. 9 illustrates a block diagram of the file fetch system 100 in which an application file (e.g. 125-1) is downloaded by a client device 110-2 which is different from the client device 110-1 on which the application file 125-1 was originally saved locally. In this particular use scenario, the client device 110-1 may be referred to as a "remote client device" since it is physically remote from the client device 110-2 which is downloading the application file 125-1 and the client device 110-2 may be referred to as a "local client device" since it is actually performing the downloading operations. In addition, for ease of explanation, application file 125-1 stored on client device 110-1 is representative of one of the application files 125-1 . . . 125-N stored in memory 120-1 on remote client device 110-1 (shown in FIG. 1) selected to be downloaded to client device 110-2. However, it should be understood that any of the application files 125-1 . . . 125-N saved on remote client device 110-1 and identified on roaming file list 181 may be selected for download to client device 110-2.

For example, a user of client device 110-2 may request to download application file 125-1 identified on roaming file list 181 saved on remote client device 110-1 (shown in FIG. 1) via file fetch server 150 and network 140. In particular, a user on client device 110-2 may select the available application file 125-1 identified in the roaming file list 181 via a user interface shown, for example, in FIGS. 8A-8C. The selected application file 125-1 may be available for download based on the machine state of the remote client device 110-1 determined by web service 160 as described above with reference to FIGS. 3-6. Once application file 125-1 is selected by the user of client device 110-2, file manager component 173-2 sends a control directive 910 to file fetch server 150 via network 140 to instruct web service 160 to retrieve application file 125-1 stored on client device 110-1. Web service 160 establishes a secure communication session with client device 110-1 and fetches or retrieves application file 125-1 from memory 120-1 based on the GUID associated with the selected application file 125-1. Server file manager 155 receives the application file 125-1 and, with a communication session established by web service 160, downloads the returned application file 125-1 from file fetch server 150 to client device 110-2 via network 140.

As stated above, client devices 110-1, 110-2 communicate with web service 160 via network 140 to transfer the recent file list 175-1 as well as to transfer and retrieve application files (e.g. 125-1) to/from file fetch server 150. There exists standard web services specifications, architecture and invocation models to provide for registration and communication to and from web services, such as web service 160 via network 140, as defined by the Web Services Interoperability Organization (WS-I). A number of different techniques may be utilized to provide such communication any of which may be utilized to register client devices 110-1, 110-2 with web service 160 and to provide for the transfer of recent file list 175-1, roaming file lists 180, 181 as well as application file 125-1. However, by way of background, a typical interaction between client device 110-1 and web service 160 will be described as an example of one way client 110-1 communicates with web service 160 to transfer recent file list 175-1 and application file 125-1 to file fetch server 150 as well as registration and communication between client devices 110-1, 110-2 and web service 160. The following description is equally applicable to communication between web service 160 and any of the client devices 110-1 . . . 110-N.

For example, to communicate with web service 160, an application program (e.g. application program 170-1) of client device 110-1 initiates a procedure call to web service 160 using a WSDL file obtained from web service 160. An HTTP communication channel over network 140 is established with web service 160 using a service endpoint associated with the web service 160 defined in the WSDL file. A procedure call is sent from application program 170-1 to web service 160 over the HTTP connection using SOAP and RPC. Briefly, RPC is an inter-process communication mechanism that enables data exchange and invocation of functionality between client device 110-1 and web service 160. The web service 160 accepts the procedure call, performs processing based on the procedure call, and returns a response to client device 110-1 via the established HTTP communication channel over network 140 also using SOAP and RPC. Client device 110-1 returns the response from web service 160 to the application program 170-1. This procedure generally describes one way registration, authentication and communication between a client device 110-1 . . . 110-N and web service 160 may be accomplished.

Figure 10:
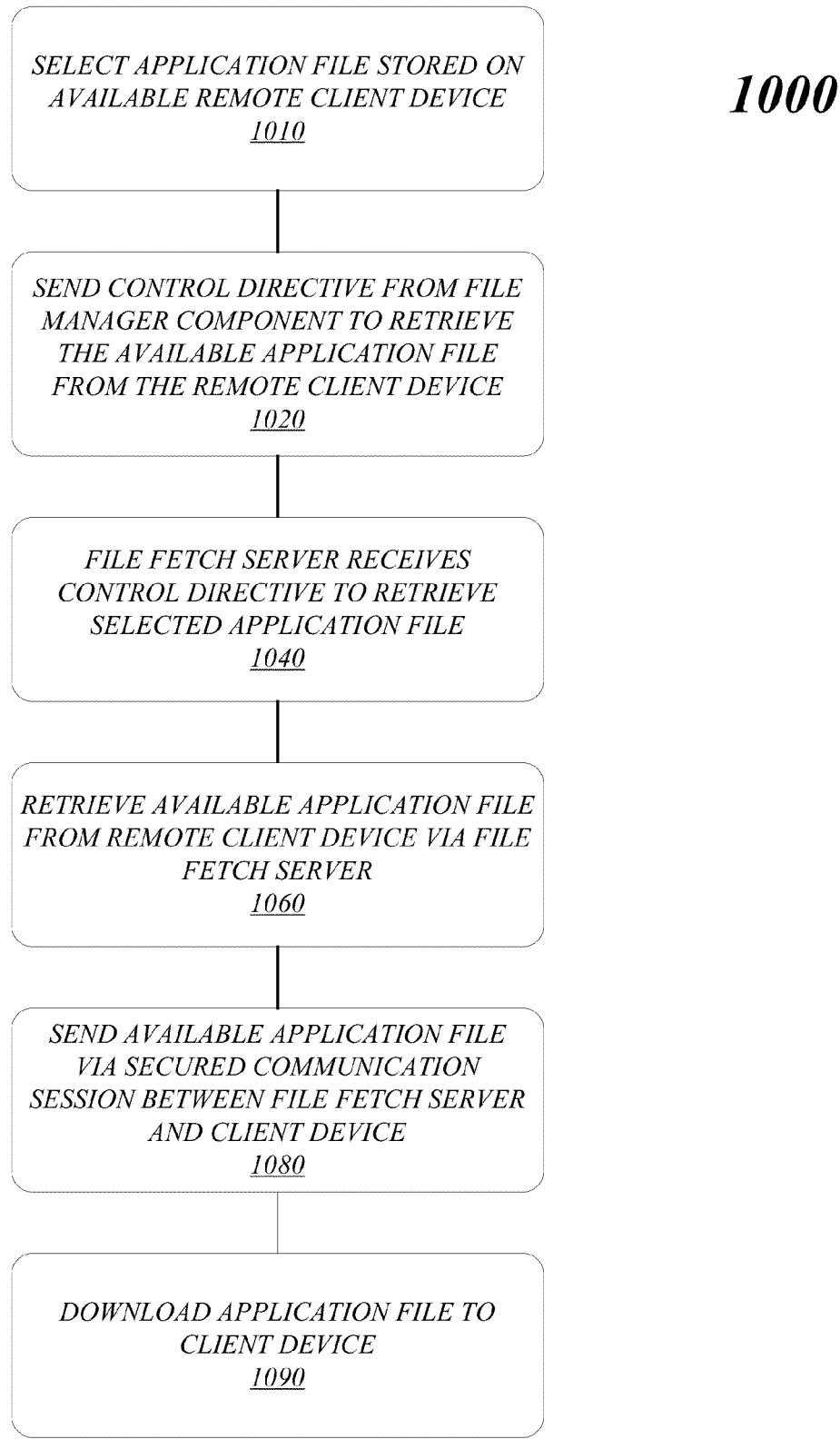
FIG. 10 illustrates an embodiment of a message flow for the system of FIG. 9.

FIG. 10 illustrates one embodiment of a logic flow 1000 for the system of FIG. 9. The logic flow 1000 may be representative of some or all of the operations executed by one or more embodiments described herein, such as the client device 110-2, for example.

In the illustrated embodiment shown in FIG. 10, a user selects an available application file stored on a remote client device at block 1010 where the availability of the application file is based on the machine state of the remote client device. For example, file manager component 173-2 processes a request from a user to select application file 125-1 saved on remote client device 110-1. The application file 125-1 has an associated availability indicator based on the machine state of client device 110-1. In particular, if the machine state of client device 110-1 is ON, the GUID 300 corresponding to the selected application file 125-1 included in the roaming file list 181 has an associated visual indicia to indicate that the application file 125-1 is available from client device 110-1.

A control directive is sent by the file manager component of a particular client device to retrieve the available application file selected by a user from the remote client device at block 1020. For example, file manager component 173-2 of client device 110-2 sends a control directive 910 to file fetch server 150 via network 140 to instruct the server file manager 155 to retrieve the selected application file 125-1 stored on remote client device 110-1 via web service 160.

The control directive is received by the file fetch server 150 to retrieve the available application file selected by the user of client device 110-2 at block 1040. For example, the file fetch server 150 receives the control directive 910 from client device 110-2 and web service 160 establishes a secure communication session with remote client device 110-1.

The available application file is retrieved from the remote client device 110-1 at block 1060 via the secure communication session established between web service 160 and remote client device 110-1. For example, web service 160 fetches or retrieves the selected application file 125-1 from memory 120-1 of remote client device 110-1 based on the GUID 300 associated therewith and the file manager 155 on file fetch server 150 receives the selected application file 125-1.

The available application file is sent from the file fetch server 150 to the client device 110-2 at block 1080. For example, the server file manager 155 on the file fetch server 150 sends the available application file 125-1 to client device 110-2 via network 140 using the communication session established by web service 160 between client device 110-2 and file fetch server 150.

The selected application file is downloaded to the client device 110-2 at block 1090. For example, the client device 110-2 downloads the selected application file 125-1 retrieved from client device 110-1 via file fetch server 150 and a user opens the file using file manager component 173-2 and application program 170-2.

Figure 11:
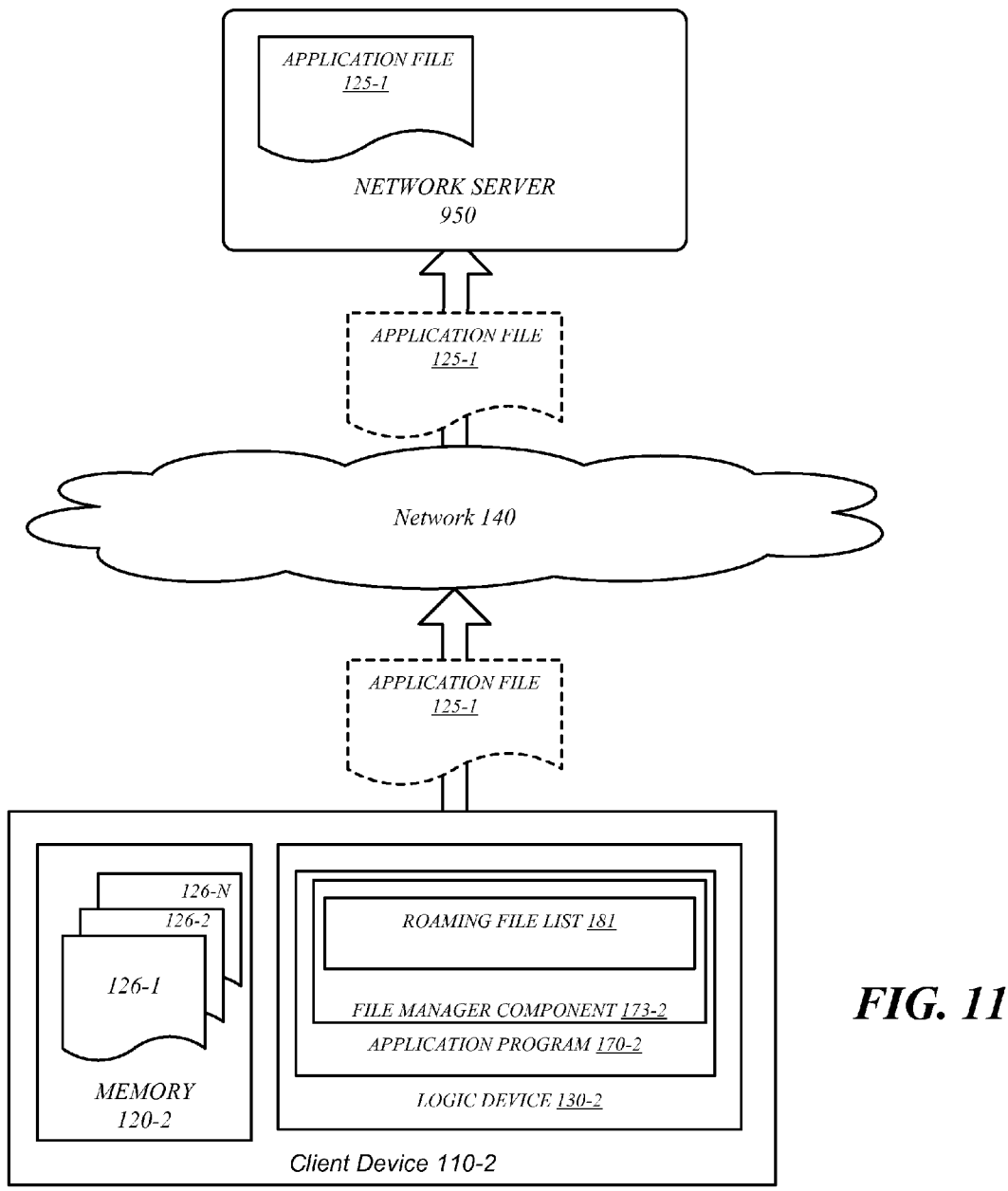
FIG. 11 illustrates a block diagram of a file fetch system.

FIG. 11 illustrates a block diagram of the file fetch system 100 in which the client device 110-2, and in particular file manager component 173-2, saves the application file 125-1 to a network server 950 via network 140. In particular, file manager component 173-2 downloads the application file 125-1 from the file fetch server 150 as described above with reference to the system of FIG. 10. When a user of client device 110-2 utilizes application program 170-2, and in particular file manager component 173-2, to open the application file 125-1, a prompt is displayed by the file manager component 173-2 to the user via a user interface and an output device (e.g. display) that the downloaded file is "read-only." In the event that the user of client device 110-2 saves and/or modifies and saves the application file 125-1 using application program 170-2, the user may do so by uploading the application file 125-1 to a network server 950 via network 140. Examples of such a network server 950 may include without limitation MICROSOFT SHAREPOINT SERVER, MICROSOFT WINDOWS LIVE SKYDRIVE®, MICROSOFT LYNC SERVER, MICROSOFT OFFICE FORMS SERVER, MICROSOFT OFFICE GROOVE® SERVER, MICROSOFT OFFICE PROJECT SERVER, MICROSOFT OFFICE PROJECT PORTFOLIO SERVER, and MICROSOFT OFFICE PERFORMANCEPOINT® SERVER. In particular, file manager component 173-2 sends a control directive to a server application on network server 950 to save application file 125-1. Once a communication session is established between network server 950 and client device 110-2, application file manager component 173-2 sends application file 125-1 to server 950 via network 140.

Since the downloaded file is in read-only format, a user may save the application file 125-1 to local memory 120-2 on client device 110-2 if a new version of the application file 125-1 is saved and/or the application file 125-1 is renamed. In either case, a new GUID 300, specific to the renamed or new version of application file 125-1 will be generated by file manager component 173-2 and the roaming file list 181 associated with application program 170-2 will be updated with the renamed or new version of application file 125-1. In the event that application file 125-1 is saved as a new version, various versioning and synchronizing procedures may be implemented to reconcile the various versions of application file 125-1 between client devices 110-1 and 110-2. In either event, the application file 125-1 downloaded to client device 110-2, but saved as a different file or version will receive a new GUID 300 and will no longer be associated with application file 125-1 originally saved on client device 110-1.

Figure 12:
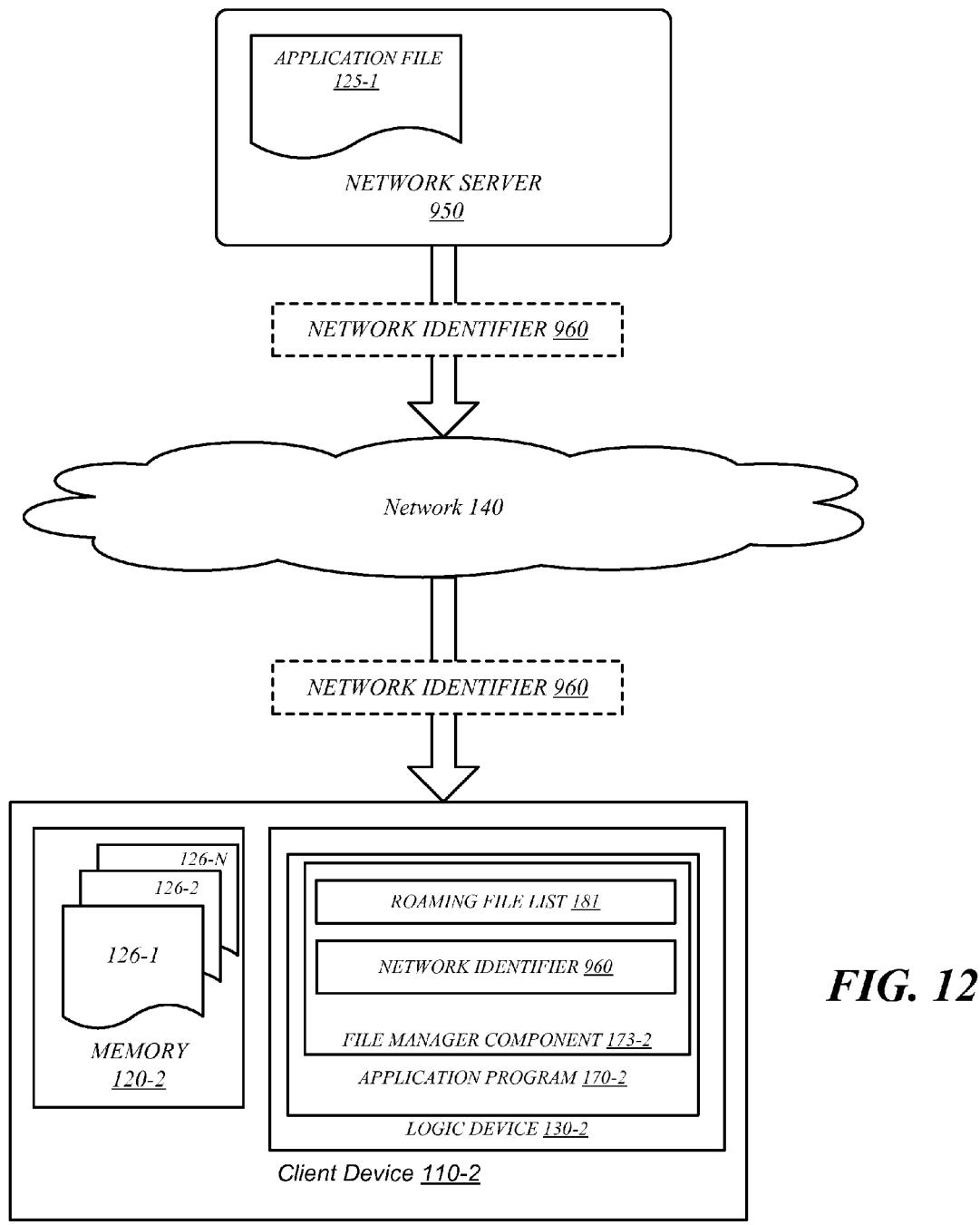
FIG. 12 illustrates a block diagram of a file fetch system.

FIG. 12 illustrates a block diagram of the file fetch system 100 in which the GUID in the roaming file list 181 associated with the application file downloaded from client device 110-1 and saved to network server 950 is updated with a network identifier 960 in order to identify where a newer version of the application file is stored. Since the application file 125-1 was downloaded from the remote client device 110-1 to client device 110-2 and saved to network server 950, system 100 updates the GUID for the application file 125-1 with the network identifier 960 to differentiate between the two versions of the same application file, namely the application file originally stored on client device 110-1 and the same or a newer version of the application file stored by a user on network server 950.

In particular, when application file 125-1 is saved by a user on network server 950 a network identifier 960 is sent to file manager component 173-2 of application program 170-2. The network identifier 960 may be a network server file path indicating where on network server 950 application file 125-1 is stored. An example of such a network server file path may be a Uniform Resource Identifier (URI) or other application-specific network server file path.

File manager component 173-2 receives the network identifier 960 and adds the network identifier to the GUID associated with application file 125-1 on the roaming file list 181. In particular and as described above with reference to FIG. 7, roaming file list 181 includes the roaming file list 180 associated with client device 110-1 received from file fetch server 150 and the recent file list 175-2 associated with application program 170-2 local to client device 110-2. Since the source of application file 125-1 was originally client device 110-1, the GUID 300 associated with application file 125-1 includes the machine identifier 305 of client device 110-1 and the local file path portion 310 which identifies the location and file name within the client device 110-1 where the application file 125-1 was stored. However, the application file 125-1 was subsequently stored by a user of client device 110-2 on network server 950 which is a location other than client device 110-1, the original source of the application file. The network identifier 960 represents the new saved location of the application file 125-1 originally retrieved from client device 110-1. In this manner, the GUID 300 associated with application file 125-1 may be updated to include the network identifier 960, along with the previous GUID information of the machine identifier 305 representing client device 110-1 and the local file path portion 310.

Figure 13:
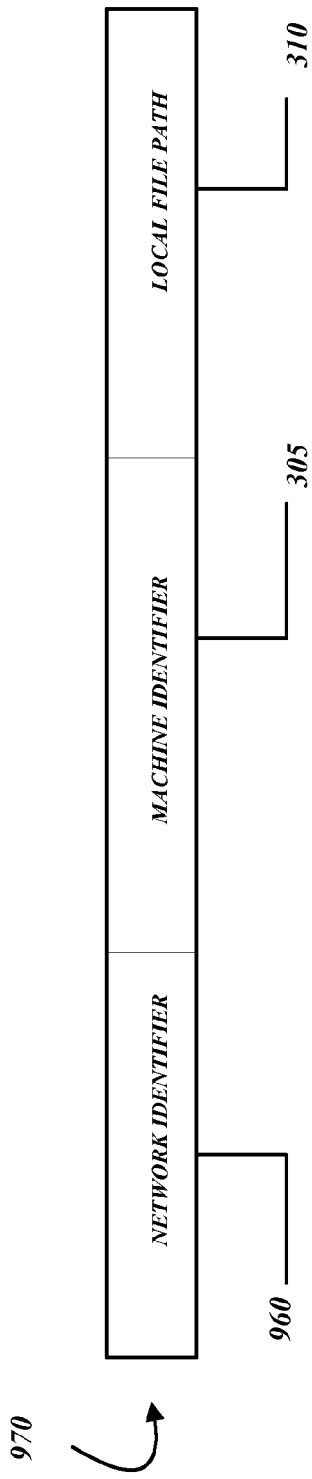
FIG. 13 is a block diagram of an exemplary globally unique identifier.

FIG. 13 is a block diagram of an exemplary GUID 970 associated with application file 125-1 saved on network server 950. It should be understood that although the following description is with respect to application file 125-1, the format of the GUID 970 is equally applicable to any application file downloaded from a first client device (e.g. 110-1) and saved to a network server (e.g. 950) by a second client device (e.g. 110-2) in accordance with the present disclosure. The GUID 970 shown in FIG. 13 may be similar to the GUID 300 shown in FIG. 3, modified with additional information. For example, GUID 970 comprises a machine identifier 305, local file path portion 310 and network identifier 960. The machine identifier 305 identifies the particular machine or client device where the application file 125-1 was originally saved, in this case client device 110-1. The local file path portion 310 of the GUID 970 identifies the location and file name, associated with the particular application program 170-1, within client device 110-1 where the application file 125-1 was stored. The network identifier 960 which may represent the file path on network server 950 where application file 125-1 is stored is added to the machine identifier 305 and local file path portion 310 to comprise GUID 970.

Figure 14:
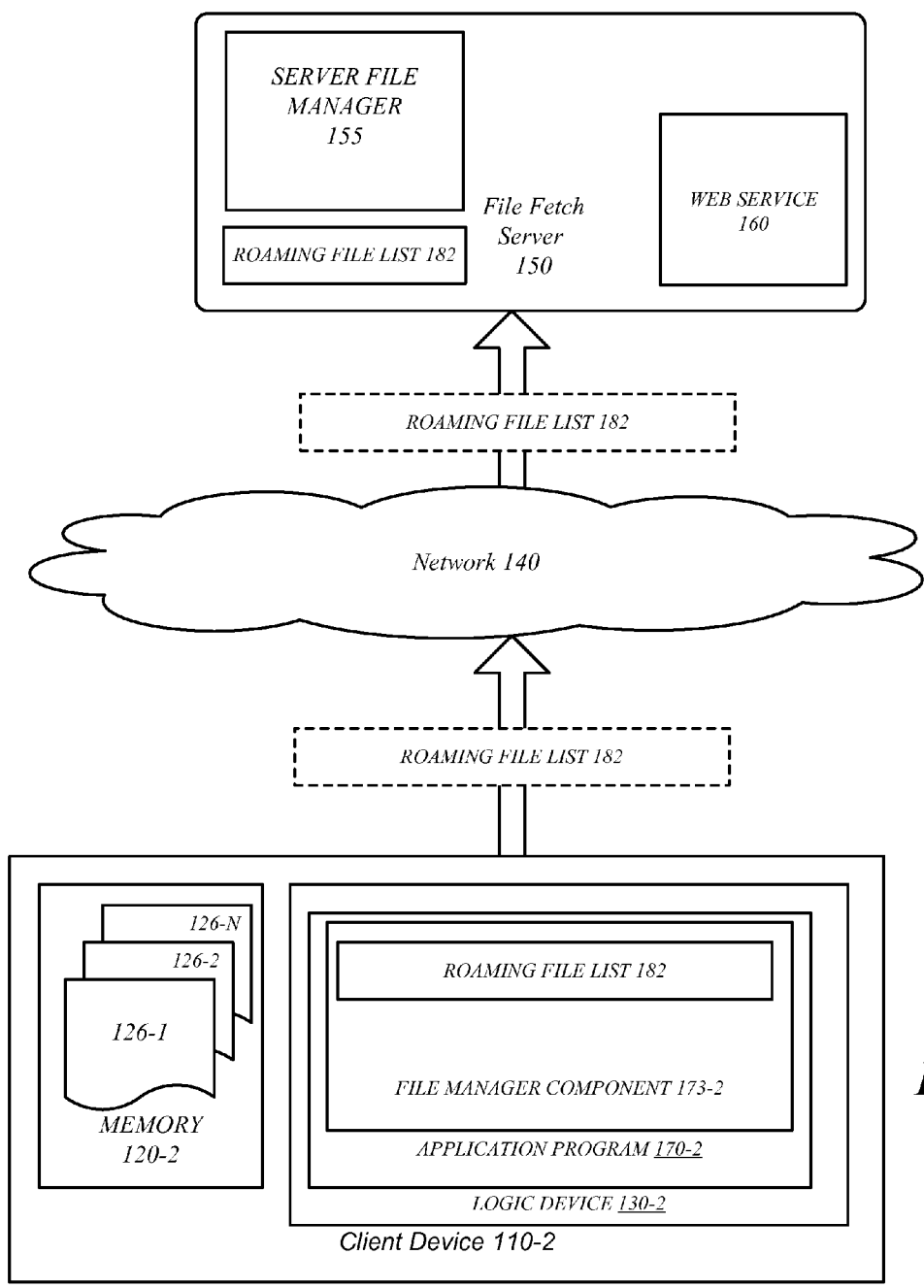
FIG. 14 illustrates a block diagram of a file fetch system.

FIG. 14 illustrates a block diagram of the file fetch system 100 in which a roaming file list 182, generated by file manager component 173-2 of client device 110-2, is sent to file fetch server 150 via network 140. Once the application file is stored on network server 950, the roaming file list is used by system 100 to recognize that a newer version of the application file, originally stored locally on client device 110-1 is stored on the network server and alerts the user of this newer version of the application file. For example, if a user is no longer using client device 110-2, but returns to using client device 110-1 and attempts to access the application file 125-1, the user is alerted that a newer version of the application file 125-1 is stored on the network server 950. The user is then given the option of either accessing the newer version stored on the network server 950 or accessing the original version stored locally on client device 110-1. It is the use of the roaming file list 182, sent to file fetch server 150 from client device 110-2, and later compared with the recent file list 175-1 of client device 110-1, that enables the system 100 to alert a user that a newer version of the application file is available.

In particular, when the application file 125-1 is stored on network server 950 as described with reference to FIG. 11, the GUID 970 associated with the application file 125-1 was modified from the GUID 300 identified in roaming file list 181. Again, roaming file list 181 included the application files saved on client device 110-1 as well as the recent file list 175-2 associated with the application files 126-1 . . . 126-N for application program 170-2 saved locally on client device 110-2. When application file 125-1 is stored on network server 950, file manager component 173-2 updates the roaming file list 181 with GUID 970 and generates roaming file list 182. In this manner, roaming file list 182 includes the recent file list 175-2 as well as the GUID 970 for application file 125-1 saved to network server 950. The roaming file list 182 is sent, by file manager component 173-2, to the file fetch server 150 via network 140 and is compared (as detailed below) to recent file list 175-1 of client device 110-1 to determine if a newer version of the application file 125-1 is available for a user. The roaming file list 182 may be sent to the file fetch server 150 at various predetermined time intervals by file manager component 173-2, during use of the application program 170-2, or may be sent upon the occurrence of a particular instruction from application program 170-2.

Figure 15:
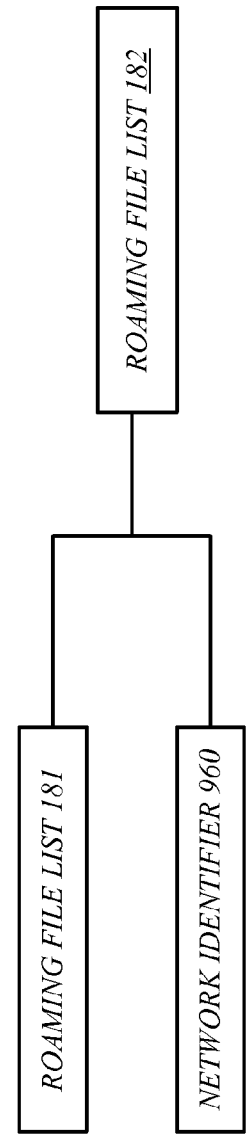
FIG. 15 illustrates a functional block diagram of a roaming file list.

FIG. 15 illustrates a block diagram of roaming file list 182. Roaming file list 182 is a combination of roaming file list 181 and network identifier 960 associated with one or more application files identified on roaming file list 181. In particular, roaming file list 181 is a combination of the application files identified in roaming file list 180 and the application files identified on recent file list 175-2. Again, the roaming file list 180 identifies application files saved on client device 110-1 and the recent file list 175-2 identifies the application files saved locally on client device 110-2. When the application file 125-1 is saved to network server 950, a network identifier 960 is assigned to the GUID 300 of application file 125-1 to comprise GUID 970. File manager component 173-2 updates roaming file list 181 with GUID 970 associated with application file 125-1 to generate roaming file list 182. In this manner, roaming file list 182 includes: (i) the application files 125-1 . . . 125-N saved on client device 110-1 based on the received roaming file list 180; (ii) the application files 126-1 . . . 126-N identified on recent file list 175-2 from file manager component 173-2 local to client device 110-2; and (iii) the application files 125-1 . . . 125-N received by client device 110-2 from client device 110-1, but saved to network server 950. The application files identified on roaming file list 182 which are unavailable due to the machine state of client device 110-1 are still identified in the roaming file list 182, but are indicated as unavailable to the user of client device 110-2 consistent with the exemplary user interface views of FIGS. 8A-8C.

Figure 16:
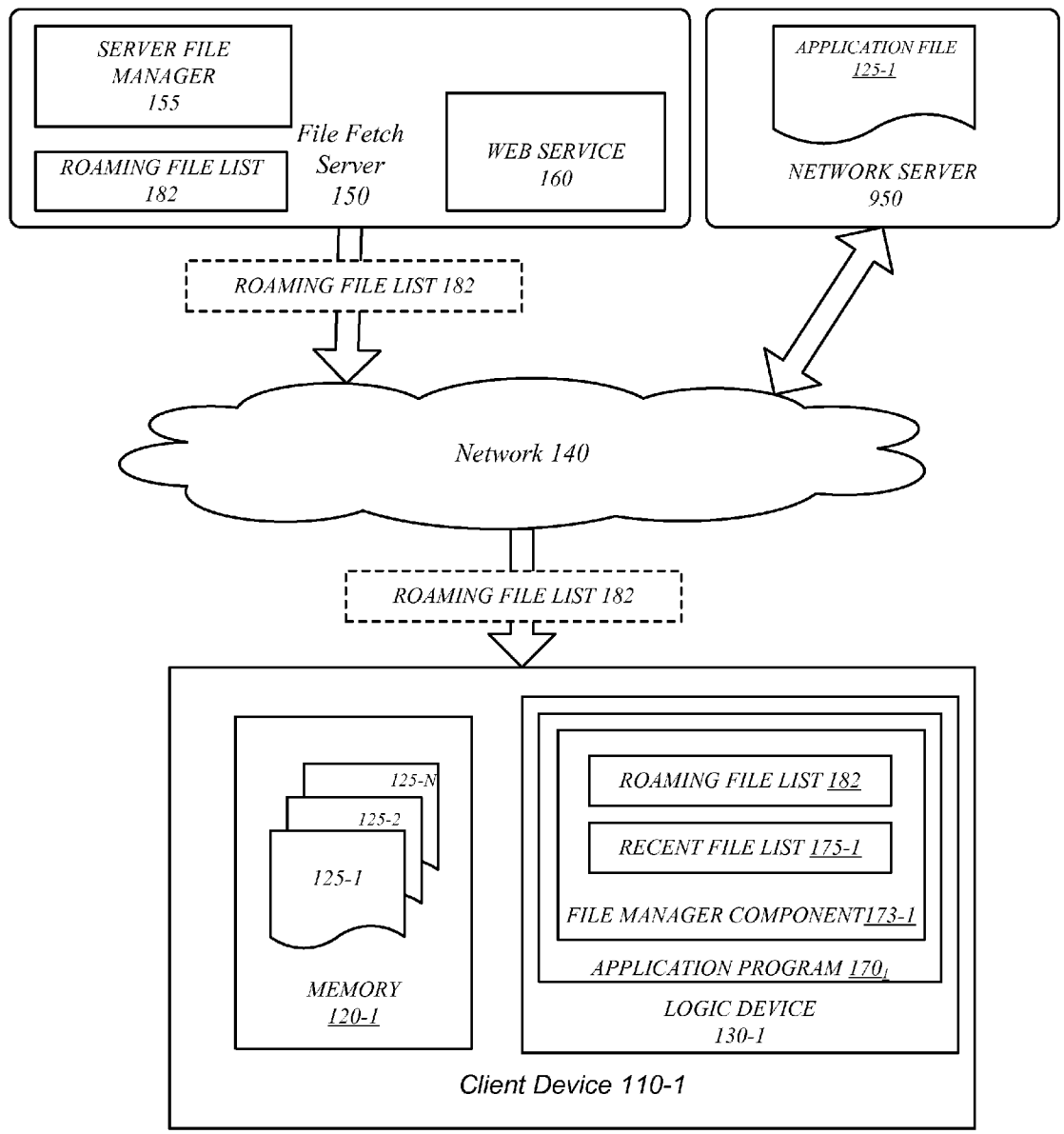
FIG. 16 illustrates a block diagram of a file fetch system.

FIG. 16 illustrates a block diagram of the file fetch system 100 in which a user of client device 110-1 opens the application program 173-1 to retrieve an application file previously saved locally to device 110-1. Application program 173-1 sends a control directive to web service 160 to retrieve the roaming file list 182 previously saved on file fetch server 150 from client 110-2. The roaming file list 182 is compared to the recent file list 175-1 associated with application program 170-1. Again, recent files list 175-1 lists certain of the application files 125-1 . . . 125-N accessed by a user of client device 110-1 associated with the particular application program 170-1.

When a user selects a particular application file 125-1 . . . 125-N identified on the recent file list 175-1, file manager component 173-1 checks the roaming file list 182 saved on file fetch server 150 to determine if the selected application file 125-1 . . . 125-N has a new location. In particular, file manager 173-1 checks the GUID (e.g. 300) of the selected application file 125-1 . . . 125-N from recent file list 175-1 with the GUID (e.g. 300) of the same application file on roaming file list 182. If the GUID (e.g. 300) on the recent file list 175-1 for the selected application file 125-1 . . . 125-N matches the GUID (e.g. 300) of the same application file on roaming list 182, file manager component 173-1 opens the selected application file 125-1 . . . 125-N stored in memory 120-1. If the GUID (e.g. 300) on the recent file list 175-1 for the selected application file 125-1 . . . 125-N does not match the GUID (e.g. 970) of the same application file 125-1 . . . 125-N on roaming list 182, file manager component 173-1 utilizes a network identifier 960 of the non-matching GUID (e.g. 970) to send a request to network server 950 to retrieve the application file 125-1 . . . 125-N from the network server 950. By way of example, the GUID 300 for a selected application file 125-1 which was identified on the recent file list 175-1 comprises a corresponding machine identifier 305 and a local file path portion 310. However, if the same application file 125-1 was saved by a user via client device 110-2 to network server 950, the GUID 970 will also include a network identifier 960 in addition to the machine identifier 305 and a local file path portion 310. Thus, the GUID 300 for the same application file 125-1 will not match when the application file 125-1 has been saved to a new location (e.g. network server 950). In this instance, file manager component 173-1 renders a prompt to the user indicating that a new version of the selected application file 125-1 is available and whether or not the user would like to switch to the application file 125-1 saved on the network server 950.

Figure 17:
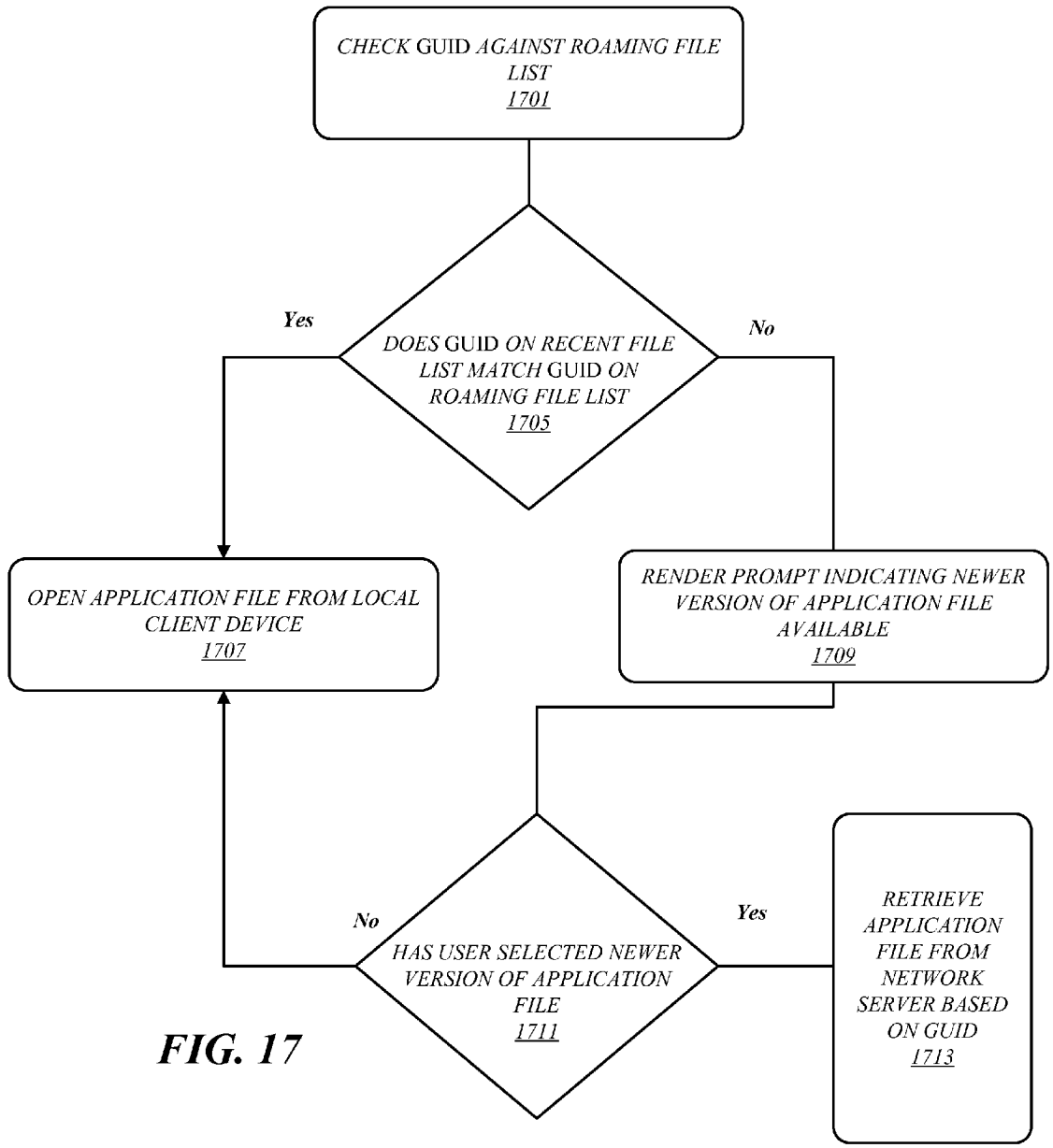
FIG. 17 illustrates one embodiment of a logic flow for the system of FIG. 16.

FIG. 17 illustrates one embodiment of a logic flow 1700 for the file fetch system 100. The logic flow 1700 may be representative of some or all of the operations executed by one or more embodiments described herein, such as the retrieval of an application file originally saved a user on client device 110-1, but subsequently downloaded and saved to network server 950 by a user on client device 110-2.

In the illustrated embodiment shown in FIG. 17, the logic flow 1700 checks the GUID of an application file against the roaming file list. For example, when a user selects application file 125-1 (which was originally saved locally on client device 110-1) via the recent file list 175-1, the file manager component 173-1 checks the roaming file list 182 saved on file fetch server 150 to determine if the selected application file 125-1 has a new saved location. Alternatively, the roaming file list 182 may be downloaded from the file fetch server 150 and saved to the client device (e.g. 110-1) in which case the file manager component 173-1 checks the roaming file list 182 on the local client device 110-1 when a user selects application file 125-1 to determine if it has a new saved location. This alternative provides system performance since the file manager component 173-1 does not have to communicate with the file fetch server 150, but rather performs the check locally at client device 110-1.

The logic flow 1700 determines if the GUID on the recent file list matches the GUID on the roaming file list at block 1705. For example, file manager 173-1 checks the GUID of the selected application file 125-1 from recent file list 175-1 with the GUID of the same application file 125-1 on roaming file list 182 to determine if they match.

The logic flow 1700 opens the application file from the local client device at block 1707 if the GUID on the recent file list matches the corresponding GUID for the same application file on the roaming file list. For example, if the application file 125-1, originally saved on client device 110-1 was not saved to network server 950, the GUID 300 for application file 125-1 identified on the recent file list 175-1 will match the GUID 300 for application file 125-1 identified on the roaming file list 182. This indicates that a new version of application file 125-1 does not exist. Thus, file manager 173-1 opens application file 125-1 stored locally in memory 120-1 of client device 110-1.

The logic flow 1700 renders a prompt indicating that a new version of the selected application file is available at block 1709 if the GUID on the recent file list does not match the corresponding GUID for the same application file on the roaming file list. For example, if the application file 125-1 was originally saved on client device 110-1, but was subsequently accessed by a user of client device 110-2 and saved to network server 950, the GUID 300 identified in the recent file list 175-1 and the GUID 970 identified in the recent file list 182 for the same application file 125-1 will not match. In particular, the GUID 300 for the selected application file 125-1 identified on the recent file list 175-1 comprises a corresponding machine identifier 305 and a local file path portion 310. However, since the same application file 125-1 was saved by a user via client device 110-2 to network server 950, the GUID 970 will also include a network identifier 960 in addition to the machine identifier 305 and the local file path portion 310. Thus, the GUID s 300, 970 for the same application file 125-1 will not match and a prompt will be rendered to the user indicating the newer version of the application file 125-1 is available from network server 950.

The logic flow 1700 determines if the user selected the newer version of the application file at block 1711 based on the rendering of the prompt indicating that a new version of the selected application file is available. For example, file manager component 173-1 determines if the user of client device 110-1 selected the newer version of the application file 125-1 saved on network server 950. If the user does not select the newer version of the application file 125-1, the logic flow opens the application file 125-1 saved on the local client device at block 1707. For example, if the user does not select to open the newer version of application file 125-1 saved on network server 950, application manager component 173-1 opens the application file 125-1 saved in memory 120-1 of client device 110-1.

The logic flow 1700 retrieves the application file from network server at block 1713 if the user has selected the new version of the application file. For example, if the user selects to open the newer version of application file 125-1 saved on network server 950, file manager component 173-1 retrieves the application file from network server 950.

Figure 18:
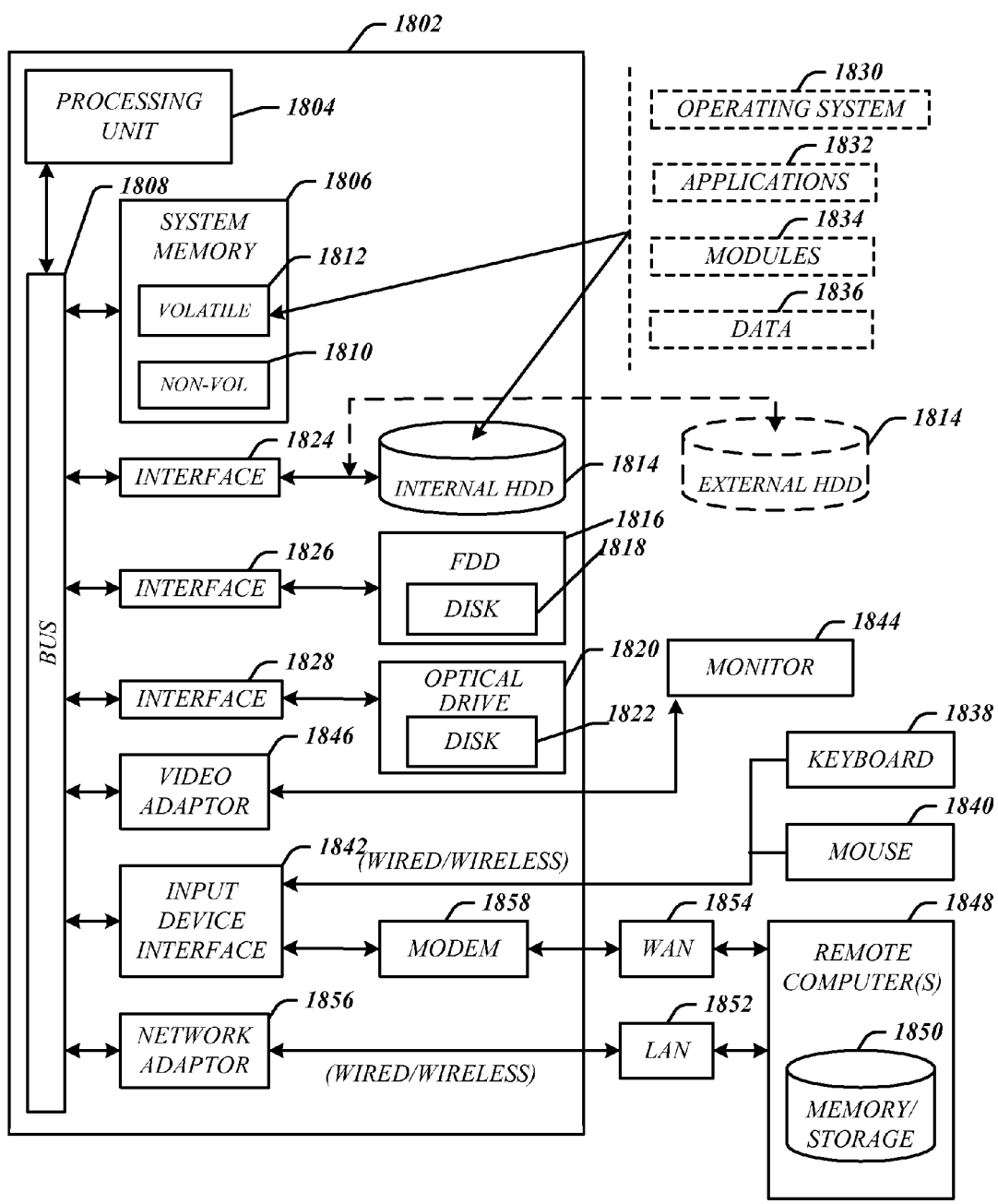
FIG. 18 illustrates an embodiment of a computing architecture.

FIG. 18 illustrates an embodiment of an exemplary computing architecture 1800, such as client devices 110-1 and 110-2 suitable for implementing various embodiments of system 100 as previously described. The computing architecture 1800 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1800.

As shown in FIG. 18, the computing architecture 1800 comprises a processing unit 1804, a system memory 1806 and a system bus 1808. The processing unit 1804 can be any of various commercially available processors. Dual microprocessors and other multi-processor architectures may also be employed as the processing unit 1804. The system bus 1808 provides an interface for system components including, but not limited to, the system memory 1806 to the processing unit 1804. The system bus 1808 can be any of several types of bus structure that may further interconnect to a memory bus (with or without a memory controller), a peripheral bus, and a local bus using any of a variety of commercially available bus architectures.

The system memory 1806 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 18, the system memory 1806 can include non-volatile memory 1810 and/or volatile memory 1812. A basic input/output system (BIOS) can be stored in the non-volatile memory 1810.

The computer 1802 may include various types of computer-readable storage media, including an internal hard disk drive (HDD) 1814, a magnetic floppy disk drive (FDD) 1816 to read from or write to a removable magnetic disk 1818, and an optical disk drive 1820 to read from or write to a removable optical disk 1822 (e.g., a CD-ROM or DVD). The HDD 1814, FDD 1816 and optical disk drive 1820 can be connected to the system bus 1808 by a HDD interface 1824, an FDD interface 1826 and an optical drive interface 1828, respectively. The HDD interface 1824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1810, 1812, including an operating system 1830, one or more application programs 1832, such as application programs 170-1, 170-2, other program modules 1834, and program data 1836. A user can enter commands and information into the computer 1802 through one or more wire/wireless input devices, for example, a keyboard 1838 and a pointing device, such as a mouse 1840. Other input devices may include a microphone, an infra-red (IR) remote control, a joystick, a game pad, a stylus pen, touch screen, or the like. These and other input devices are often connected to the processing unit 1804 through an input device interface 1842 that is coupled to the system bus 1808, but can be connected by other interfaces such as a parallel port, IEEE 1394 serial port, a game port, a USB port, an IR interface, and so forth.

A monitor 1844 or other type of display device is also connected to the system bus 1808 via an interface, such as a video adaptor 1846. The monitor 1844 is an example of the user interface device used to display the views illustrated in FIGS. 8A-8C. In addition to the monitor 1844, a computer may also include other peripheral output devices, such as speakers, printers, and so forth.

The computer 1802 may operate in a networked environment using logical connections via wire and/or wireless communications to one or more remote computers, such as a remote computer 1848. The remote computer 1848 can be a workstation, a server computer, a router, a personal computer, portable computer, microprocessor-based entertainment appliance, a peer device or other common network node, and typically includes many or all of the elements described relative to the computer 1802, although, for purposes of brevity, only a memory/storage device 1850 is illustrated. The logical connections depicted include wire/wireless connectivity to a local area network (LAN) 1852 and/or larger networks, for example, a wide area network (WAN) 1854. Such LAN and WAN networking environments are commonplace in offices and companies, and facilitate enterprise-wide computer networks, such as intranets, all of which may connect to a global communications network, for example, the Internet.

When used in a LAN networking environment, the computer 1802 is connected to the LAN 1852 through a wire and/or wireless communication network interface or adaptor 1856. The adaptor 1856 can facilitate wire and/or wireless communications to the LAN 1852, which may also include a wireless access point disposed thereon for communicating with the wireless functionality of the adaptor 1856.

When used in a WAN networking environment, the computer 1802 can include a modem 1858, or is connected to a communications server on the WAN 1854, or has other means for establishing communications over the WAN 1854, such as by way of the Internet. The modem 1858, which can be internal or external and a wire and/or wireless device, connects to the system bus 1808 via the input device interface 1842. In a networked environment, program modules depicted relative to the computer 1802, or portions thereof, can be stored in the remote memory/storage device 1850. It will be appreciated that the network connections shown are exemplary and other means of establishing a communications link between the computers can be used.

The computer 1802 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 19:
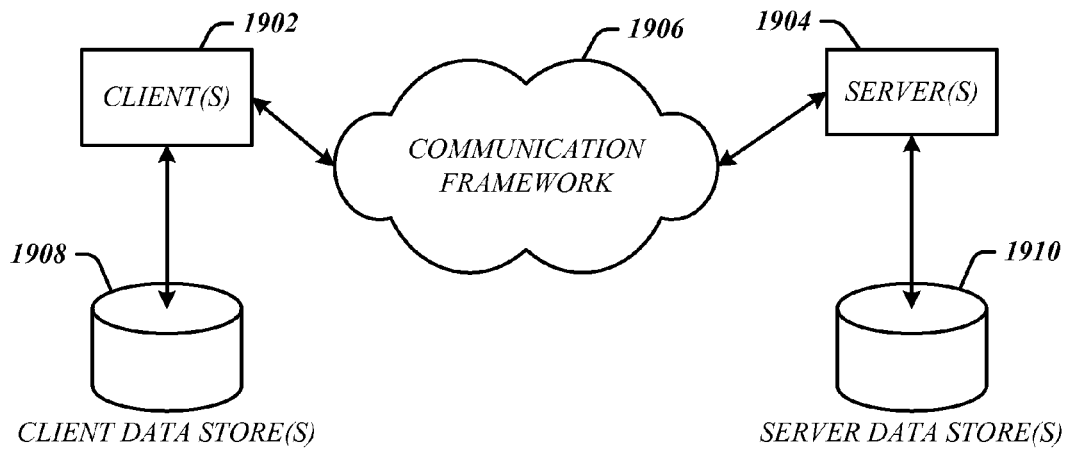
FIG. 19 illustrates an embodiment of a communications architecture.

FIG. 19 illustrates a block diagram of an exemplary communications architecture 1900 suitable for implementing various embodiments of system 100 as previously described. The communications architecture 1900 includes various common communications elements, such as a transmitter, receiver, transceiver, radio, network interface, baseband processor, antenna, amplifiers, filters, and so forth. The embodiments, however, are not limited to implementation by the communications architecture 1900.

As shown in FIG. 19, the communications architecture 1900 comprises includes one or more clients 1902 and servers 1904. The clients 1902 may implement the system 100. The servers 1904 may implement the server systems 150 and/or 950. The clients 1902 and the servers 1904 are operatively connected to one or more respective client data stores 1908 and server data stores 1910 that can be employed to store information local to the respective clients 1902 and servers 1904, such as cookies and/or associated contextual information.

The clients 1902 and the servers 1904 may communicate information between each other using a communication framework 1906. The communications framework 1906 may implement any well-known communications techniques and protocols, such as those described with reference to system 100. The communications framework 1906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Various embodiments as described herein may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus comprising:
a logic device having a local memory, the logic device operative to generate a unique application file identifier every time an application file is saved to the local memory and add the application file identifier to a roaming file list, the application file identifier comprising a machine identifier portion corresponding to an identity of the remote client device on which the application file is stored and a file path portion corresponding to a storage location within the local memory.

2. The apparatus of claim 1, wherein the application file identifier in the roaming file list further comprises a status indicator representing a machine state of the logic device.

3. The apparatus of claim 1, further comprising a remote client device operative to send a control directive to the logic device via the file fetch server to retrieve the application file stored on the local memory.

4. The apparatus of claim 3, the remote client device operative to receive the application file stored on the local memory via the file fetch server.

5. The apparatus of claim 4, the remote client device operative to send a control directive to save the application file received via the file fetch server to a network server.

6. The apparatus of claim 5, the remote client device operative to update the application file identifier on the roaming file list with a network server identifier associated with the network server on which the application file is stored.

7. The apparatus of claim 3 wherein the remote client device is further configured to:
receive a control directive to open an application program;
generate a recent file list based on the roaming file list, wherein the recent file list is limited to document files within a date range and the recent file list is further limited to document files associated with the application program; and
provide the recent file list when opening the application program.

8. The apparatus of claim 1, the remote client device operative to receive the application file stored on the remote client device, save the application file to a network server, and update the application file identifier on the roaming file list with a network server identifier associated with the network server on which the application file is stored.

9. A method comprising:
sending a request for a roaming file list to a file fetch server from a first client device; and
receiving the roaming file list from the file fetch server by the first client device, wherein the roaming file list includes a globally unique identifier (GUID) associated with an application file stored on a second client device, the second client device operative to generate a GUID every time an application file is saved on the second client device, the GUID including a machine identifier portion identifying the second client device and a local file path portion identifying the file path of the application file stored on the second client device.

10. The method of claim 9, comprising receiving the roaming file list with an indicator corresponding to the GUID associated with an application file stored on the second client device representing a machine state of the second client device.

11. The method of claim 9, comprising sending a control directive from the first client device to instruct the file fetch server to retrieve the application file stored on the second client device.

12. The method of claim 11, comprising receiving the application file stored on the second client device via the file fetch server by the first client device.

13. The method of claim 12, comprising saving the application file received by the first client device to a network server.

14. The method of claim 9 wherein the application file identifier is an original application file identifier corresponding to a location on the second client device where the application file was originally stored, the method comprising:
opening the application file received from the second client device by the first client device;
saving the application file received by the first client device to a network server; and
updating the application file identifier on the roaming file list with a network identifier corresponding to the network server on which the application file is stored to form an updated application file identifier.

15. The method of claim 14 comprising sending the roaming file list with the network identifier to the file fetch server.

16. An article of manufacture comprising a computer storage device containing instructions that when executed cause a system to:
request a roaming file list from a file fetch server by a first client device, the roaming file list including a globally unique identifier (GUID) comprising a machine identifier portion identifying a second client device and a local file path portion identifying a file path of an application file stored on the second client device, the second client device operative to generate a GUID every time an application file is saved on the second client device;
receive the roaming file list identifying the application file stored on the second client device; and
send a control directive, from the first client device, to the file fetch server to retrieve the application file stored on the second device.

17. The article of manufacture of claim 16 further comprising instructions that when executed enable the system to receive, in the roaming file list, a machine state of the second client device on which the application file is stored.

18. The article of manufacture of claim 16 further comprising instructions that when executed enable the system to retrieve the application file from the second device.

19. The article of manufacture of claim 16 further comprising instructions that when executed enable the system to save the application file received from the second client device to a network server.

20. The article of manufacture of claim 19 further comprising instructions that when executed enable the system to add, to the roaming file list, a network identifier corresponding to the network server where the application file was saved.

* * * * *